United States Patent
Aiso et al.

(10) Patent No.: US 9,139,894 B2
(45) Date of Patent: Sep. 22, 2015

(54) STEEL FOR MACHINE STRUCTURE EXHIBITING EXCELLENT MACHINABILITY

(75) Inventors: Toshiharu Aiso, Tokyo (JP); Suguru Yoshida, Tokyo (JP); Manabu Kubota, Tokyo (JP); Kei Miyanishi, Tokyo (JP); Shuji Kozawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 340 days.

(21) Appl. No.: 13/806,691

(22) PCT Filed: Jul. 11, 2011

(86) PCT No.: PCT/JP2011/065782
§ 371 (c)(1),
(2), (4) Date: Dec. 21, 2012

(87) PCT Pub. No.: WO2012/008405
PCT Pub. Date: Jan. 19, 2012

(65) Prior Publication Data
US 2013/0101457 A1 Apr. 25, 2013

(30) Foreign Application Priority Data

| Jul. 14, 2010 | (JP) | 2010-160108 |
| Jul. 14, 2010 | (JP) | 2010-160136 |
| Jul. 14, 2010 | (JP) | 2010-160140 |
| Jul. 14, 2010 | (JP) | 2010-160141 |

(51) Int. Cl.
*C22C 38/60* (2006.01)
*C22C 38/02* (2006.01)
(Continued)

(52) U.S. Cl.
CPC ............... *C22C 38/60* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01);
(Continued)

(58) Field of Classification Search
None
See application file for complete search history.

(56) References Cited

U.S. PATENT DOCUMENTS

2002/0185201 A1  12/2002  Kitano
2009/0311125 A1*  12/2009  Miyanishi et al. .............. 420/83
(Continued)

FOREIGN PATENT DOCUMENTS

| CN | 101960035 A | 1/2011 |
| JP | 8-20841 A | 1/1996 |

(Continued)

OTHER PUBLICATIONS

Machine-English translation of Japanese patent 09-217143, Yasumoto Satoshi et al., Aug. 19, 1997.*

(Continued)

*Primary Examiner* — Deborah Yee
(74) *Attorney, Agent, or Firm* — Birch, Stewart, Kolasch & Birch, LLP

(57) ABSTRACT

This steel for a machine structure contains, in mass %: C: 0.40% to less than 0.75%; Si: 0.01% to 3.0%; Mn: 0.1% to 1.8%; S: 0.001% to 0.1%; Al: more than 0.1% and not more than 1.0%; N: 0.001% to 0.02%; and P: limited to not more than 0.05%, with a balance including Fe and inevitable impurities, in which the steel satisfies $139.38 \leq 214 \times [C] + 30.6 \times [Si] + 42.8 \times [Mn] - 14.7 \times [Al] \leq 177$ and $0.72 \leq [C] + 1/7 \times [Si] + 1/5 \times [Mn] < 1.539$.

25 Claims, 4 Drawing Sheets

(51) Int. Cl.

| | | |
|---|---|---|
| C22C 38/04 | (2006.01) | |
| C22C 38/06 | (2006.01) | |
| C22C 38/00 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/18 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/32 | (2006.01) | |
| C22C 38/34 | (2006.01) | |
| C22C 38/42 | (2006.01) | |
| C22C 38/44 | (2006.01) | |
| C22C 38/50 | (2006.01) | |
| C21D 8/02 | (2006.01) | |
| C21D 1/42 | (2006.01) | |

(52) U.S. Cl.
CPC ............ *C22C 38/16* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/42* (2013.01); *C22C 38/44* (2013.01); *C22C 38/50* (2013.01); *C21D 1/42* (2013.01); *C21D 8/0226* (2013.01)

(56) References Cited

U.S. PATENT DOCUMENTS

| | | | |
|---|---|---|---|
| 2011/0002807 | A1 | 1/2011 | Saitoh et al. |
| 2011/0229363 | A1* | 9/2011 | Sakamoto et al. ............. 420/84 |

FOREIGN PATENT DOCUMENTS

| | | | |
|---|---|---|---|
| JP | 2000-204432 A | 7/2000 | |
| JP | 2002-146473 A | 5/2002 | |
| JP | 2005-194614 A | 7/2005 | |
| JP | 2005-281860 A | 10/2005 | |
| JP | 2006-28598 A | 2/2006 | |
| JP | 2006-45678 A | 2/2006 | |
| JP | 2007-16271 A | 1/2007 | |
| JP | 2007-107020 A | 4/2007 | |
| JP | 2007-131871 A | 5/2007 | |
| JP | 2009-228049 A | 10/2009 | |
| JP | 2009-263749 A | 11/2009 | |
| JP | 2010-24549 A | 2/2010 | |
| WO | WO 2010/116670 A | 10/2010 | |

OTHER PUBLICATIONS

International Search Report, dated Sep. 6, 2011, issued in PCT/JP2011/065782.
Written Opinion of the International Searching Authority, dated Sep. 6, 2011, issued in PCT/JP2011/065782.
Chinese Office Action and Search Report, dated May 16, 2014, issued in Chinese Application No. 201180033837.0, with an English translation.
Supplementary European Search Report dated Mar. 26, 2015, issued in European Patent Application No. 11806735.4.

* cited by examiner

Ceq = [C] + 1/7[Si] + 1/5[Mn] IN THE CASE WHERE STEEL DOES NOT CONTAIN Cr
[Ceq = [C] + 1/7[Si] + 1/5[Mn] +1/9[Cr] IN THE CASE WHERE STEEL CONTAINS Cr]

A = 113 − 135[C] − 27 [Mn] IN THE CASE WHERE STEEL DOES NOT CONTAIN Cr
{A = 113 − 135[C] − 27[Mn] − 18[Cr] IN THE CASE WHERE STEEL CONTAINS Cr}

RT = 33 + 31[C] + 4.5[Si] + 1.5[Mn] IN THE CASE WHERE STEEL DOES NOT CONTAIN Cr
{RT = 33 + 31[C] + 4.5[Si] + 1.5[Mn] + 2.4[Cr] IN THE CASE WHERE STEEL CONTAINS Cr}

STEEL FOR MACHINE STRUCTURE EXHIBITING EXCELLENT MACHINABILITY

TECHNICAL FIELD

The present invention relates to a steel for a machine structure, and in particular, to a steel for a machine structure exhibiting excellent machinability, which can be used for manufacturing a high-strength automobile part.

The present application claims priority based on Japanese Patent Application No. 2010-160136 filed in Japan on Jul. 14, 2010; Japanese Patent Application No. 2010-160108 filed in Japan on Jul. 14, 2010; Japanese Patent Application No. 2010-160141 filed in Japan on Jul. 14, 2010; and Japanese Patent Application No. 2010-160140 filed in Japan on Jul. 14, 2010, the disclosures of which are incorporated herein by reference in their entirety.

BACKGROUND ART

Conventionally, machinability-improving elements such as S, Pb, and Bi are added to improve the machinability of steels. However, adding Pb and Bi reduces the strength of the steels while little affecting the forgeability. Note that the amount of Pb used has been decreasing from the viewpoint of environmental protection.

S forms MnS (soft inclusion for cutting work) to improve the machinability. However, MnS has particles larger than those of Pb and the like, and thus, stress is more likely to concentrate on MnS. Further, in the case where MnS is drawn through forging and rolling, anisotropy occurs in the steel structure, significantly reducing the strength in a specific direction. As described above, adding the machinability-improving elements leads to a reduction in the strength, and thus, it is difficult to obtain both the strength and the machinability only by adjusting the components.

To deal with these problems, studies have been made to obtain a desired strength using high-frequency hardening, and several steels for high-frequency hardening have been proposed (see Patent Documents 1 to 5).

For example, Patent Document 4 proposes a steel material exhibiting excellent machinability and fatigue characteristics after the high-frequency hardening. This steel material contains predetermined components, and has a base structure including a ferrite and a pearlite (total of both is 90 vol % or more). Further, the maximum thickness of the ferrite in the steel material is 30 μm or less.

Patent Document 5 proposes a high-frequency-hardened steel for a pinion exhibiting excellent machinability. This steel contains predetermined components, and has an average aspect ratio of inclusions including MnS of 10 or less. This steel is subjected to a high-frequency thermal treatment to make the center portion of the steel become hard, thereby obtaining bending fatigue characteristics of bending fatigue life: $1.0 \times 10^5$ cycles or more with a rotary bending stress of 280 MPa.

In recent years, there has been an increasing demand for automobile parts having higher machining accuracy and improved fatigue strength. However, conventional steels for a machine structure cannot satisfy this demand.

RELATED ART DOCUMENTS

Patent Documents

Patent Document 1: Japanese Unexamined Patent Application, First Publication No. 2002-146473

Patent Document 2: Japanese Unexamined Patent Application, First Publication No. 2007-131871

Patent Document 3: Japanese Unexamined Patent Application, First Publication No. 2007-107020

Patent Document 4: Japanese Unexamined Patent Application, First Publication No. 2006-28598

Patent Document 5: Japanese Unexamined Patent Application, First. Publication No. 2007-16271

DISCLOSURE OF THE INVENTION

Problems to be Solved by the Invention

Conventional steels for a machine structure used by applying the high-frequency hardening have a problem in that the steel for a machine structure contains a large amount of C (usually, 0.4 mass % or more) to obtain the surface hardness after the high-frequency hardening, which results in high hardness but low machinability.

In view of the facts described above, an object of the present invention is to solve the problem described above by optimizing the components in the steel, and provide a steel for a machine structure exhibiting excellent machinability.

Means for Solving the Problems

The present invention has been made on the basis of the findings described above, and the main points of the present invention are as follows:

(1) A steel for a machine structure including, in mass %: C: 0.40% to less than 0.75%; Si: 0.01% to 3.0%; Mn: 0.1% to 1.8%; S: 0.001% to 0.1%; Al: more than 0.1% and not more than 1.0%; N: 0.001% to 0.02%; and P: limited to not more than 0.05%, with a balance including Fe and inevitable impurities, in which the amount of C: [C], the amount of Si: [Si], the amount of Mn: [Mn], and the amount of Al: [Al] satisfy following Expression (1) and Expression (2).

$$139.38 \leq 214 \times [C] + 30.6 \times [Si] + 42.8 \times [Mn] - 14.7 \times [Al] \leq 177 \quad (1)$$

$$0.72 \leq [C] + 1/7 \times [Si] + 1/5 \times [Mn] < 1.539 \quad (2)$$

(2) The steel for a machine structure according to (1) above, in which the steel further satisfies the following Expression (3).

$$113 - 135 \times [C] - 27 \times [Mn] \leq 13 \quad (3)$$

(3) The steel for a machine structure according to (1) above, in which the steel further satisfies the following Expression (4).

$$55 \leq 33 + 31 \times [C] + 4.5 \times [Si] + 1.5 \times [Mn] < 72.45 \quad (4)$$

(4) The steel for a machine structure according to (2) above, in which the steel further satisfies the following Expression (4).

$$55 \leq 33 + 31 \times [C] + 4.5 \times [Si] + 1.5 \times [Mn] < 72.45 \quad (4)$$

(5) The steel for a machine structure according to any one of (1) to (4) above, in which the steel further satisfies the following Expression (5).

$$1.5 < [Si] + 1.8 \times [Mn] < 6.24 \quad (5)$$

(6) The steel for a machine structure according to any one of (1) to (5) above, in which the steel further includes, in mass %, B: 0.0001% to 0.015%.

(7) The steel for a machine structure according to any one of (1) to (6) above, in which the steel further includes, in mass %, one or more elements of Cr: 0.01% to 0.8%, Mo: 0.001% to 1.0%, Ni: 0.001% to 5.0%, and Cu: 0.001% to 5.0%, and in the case where the steel includes Cr: 0.01% to 0.8%, the following Expression (6) is used in place of Expression (1), the following Expression (7) is used in place of Expression (2), the following Expression (8) is used in place of Expression (3), and the following Expression (9) is used in place of Expression (4).

$$139.38 \leq 214 \times [C] + 30.6 \times [Si] + 42.8 \times [Mn] + 23.8 \times [Cr] - 14.7 \times [Al] \leq 177 \quad (6)$$

$$0.72 \leq [C] + 1/7 \times [Si] + 1/5 \times [Mn] + 1/9 \times [Cr] < 1.627 \quad (7)$$

$$113 - 135 \times [C] - 27 \times [Mn] - 18 \times [Cr] \leq 13 \quad (8)$$

$$55 \leq 33 + 31 \times [C] + 4.5 \times [Si] + 1.5 \times [Mn] + 2.4 \times [Cr] < 74.37 \quad (9)$$

(8) The steel for a machine structure according to any one of (1) to (7) above, in which the steel further includes, in mass %, one or more elements of Ca: 0.0001% to 0.02%, Mg: 0.0001% to 0.02%, Zr: 0.0001% to 0.02%, and Rem: 0.0001% to 0.02%.

(9) The steel for a machine structure according to any one of (1) to (8) above, in which the steel further includes, in mass %, one or more elements of Ti: 0.005% to 0.5%, Nb: 0.0005% to 0.5%, W: 0.0005% to 0.5%, V: 0.0005% to 0.5%, Ta: 0.0001% to 0.2%, and Hf: 0.0001% to 0.2%.

(10) The steel for a machine structure according to any one of (1) to (9) above, in which the steel further includes, in mass %, one or more elements of Sb: 0.0001% to 0.015%, Sn: 0.0005% to 2.0%, Zn: 0.0005% to 0.5%, Te: 0.0003% to 0.2%, Se: 0.0003% to 0.2%, Bi: 0.001% to 0.5%, and Pb: 0.001% to 0.5%.

(11) The steel for a machine structure according to any one of (1) to (10) above, in which the steel further includes, in mass %, one or more elements of Li: 0.00001% to 0.005%, Na: 0.00001% to 0.005%, K: 0.00001% to 0.005%, Ba: 0.00001% to 0.005%, and Sr: 0.00001% to 0.005%.

Effects of the Invention

According to the present invention, it is possible to provide a steel for a machine structure exhibiting excellent machinability, which can be used for manufacturing a high-strength gear exhibiting improved fatigue strength.

EMBODIMENTS OF THE INVENTION

Figure 1:
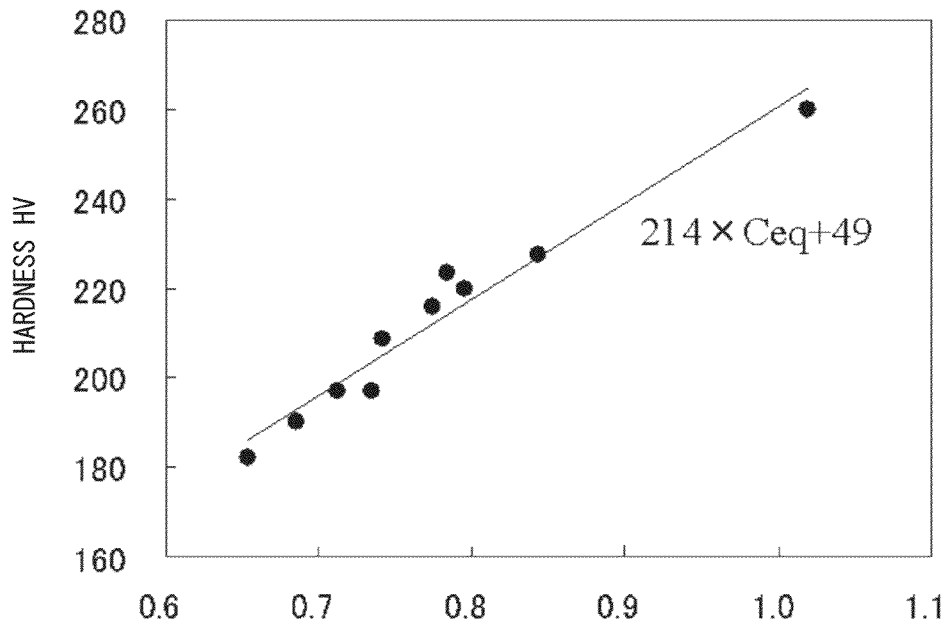
FIG. 1 is a diagram illustrating a relationship between a hardness (Hv), and a carbon equivalent Ceq (=[C]+1/7×[Si]+1/5×[Mn]) and a carbon equivalent Ceq (=[C]+1/7×[Si]+1/5×[Mn]+1/9×[Cr]).

Hereinbelow, as an embodiment of the present invention, a detailed description will be made of a steel for a machine structure that can be used for manufacturing high-strength automobile parts and exhibits excellent machinability. The steel for a machine structure according to the present invention can be suitably used as a steel for high-frequency hardening.

The steel for a machine structure according to the present invention (hereinafter, also referred to as "steel according to the present invention") contains, by mass %, C: 0.40% to less than 0.75%, Si: 0.01% to 3.0%, Mn: 0.1% to 1.8%, S: 0.001% to 0.1%, Al: over 0.1% to 1.0%, N: 0.001% to 0.02%, and P: limited to 0.05%, with a balance including Fe and inevitable impurities.

Further, in the steel according to the present invention, the amount of C: [C], the amount of Si: [Si], the amount of Mn: [Mn], and the amount of Al: [Al] satisfy the following Expression (1) and Expression (2).

$$139.38 \leq 214 \times [C] + 30.6 \times [Si] + 42.8 \times [Mn] - 14.7 \times [Al] \leq 177 \quad (1)$$

$$0.72 \leq [C] + 1/7 \times [Si] + 1/5 \times [Mn] < 1.539 \quad (2)$$

Further, in the steel according to the present invention, it is preferable that [C], [Si], [Mn], and [Al] satisfy one or more of the following Expressions (3), (4), and (5).

$$113 - 135 \times [C] - 27 \times [Mn] \leq 13 \quad (3)$$

$$55 \leq 33 + 31 \times [C] + 4.5 \times [Si] + 1.5 \times [Mn] < 72.45 \quad (4)$$

$$1.5 < [Si] + 1.8 \times [Mn] < 6.24 \quad (5)$$

Each of the expressions above will be described later.

First, the reason for limiting components for the steel according to the present invention will be described. Hereinbelow, the unit % represents a mass %.

C: 0.40% to Less than 0.75%

C is an element added to obtain the strength of the steel and the surface hardness after the high-frequency hardening. In the case where the amount of C added is less than 0.40%, the above-described effect cannot be obtained. On the other hand, in the case where the amount of C added is 0.75% or more, the toughness of the steel reduces, which possibly leads to season cracking of the rolled material. Thus, the amount of C is set to be not less than 0.40% and less than 0.75%. In order to obtain the effect obtained by addition of C in a stable manner, it is preferable to set the amount of C in the range of 0.45% to 0.73%, it is more preferable to set the amount of C in the range of 0.48% to 0.70%, and it is much more preferable to set the amount of C in the range of 0.50% to 0.61%.

Si: 0.01% to 3.0%

Si is an element that contributes to deoxidation during the steel making process, and also contributes to improving the strength of the steel. In the case where the amount of Si added is less than 0.01%, the desired effect cannot be obtained. On the other hand, in the case where the amount of Si added exceeds 3.0%, the toughness and the ductility of the steel deteriorate. Further, hard inclusions are generated, reducing the machinability of the steel. Thus, the amount of Si is set to be in the range of 0.01% to 3.0%. Preferably, the amount of Si is set to be in the range of 0.05% to 2.5%. More preferably, the amount of Si is set to be in the range of 0.1% to 1.5%.

Mn: 0.1% to 1.8%

Like Si, Mn is an element that contributes to improving the strength of the steel. In the case where the amount of Mn is less than 0.1%, the effect of the addition of Mn cannot be obtained. On the other hand, in the case where the amount of Mn exceeds 1.8%, bainite or insular martensite appears, and workability deteriorates. Thus, the amount of Mn is set to be in the range of 0.1% to 1.8%. It is preferable to set the amount of Mn in the range of 0.2% to 1.0%. It is more preferable to set the amount of Mn in the range of 0.4% to 0.8%.

S: 0.001% to 0.1%

S is an element that contributes to improving the machinability. In the case where the amount of S is less than 0.001%, the minimum required machinability for the steel cannot be obtained. On the other hand, in the case where the amount of S exceeds 0.1%, the toughness and the fatigue strength of the steel deteriorate. Thus, the amount of S is set to be in the range of 0.001% to 0.1%. It is preferable to set the amount of S in the range of 0.005% to 0.07%. It is more preferable to set the amount of S in the range of 0.01% to 0.05%.

Al: Over 0.1% to 1.0%

Al is an element that improves the machinability. A solute Al reacts with oxygen during cutting work to form a film of $Al_2O_3$ on the surface of the tool. This film prevents the tool from wearing. This film is formed in a manner such that the solute Al in the steel reacts with oxygen existing in the atmosphere, oxygen in the cutting oil, or oxygen existing in the $Fe_3O_4$ film or NiO film provided on the surface of the tool.

In the case where the amount of Al is less than 0.1% or less, the amount of $Al_2O_3$ generated is small, and the $Al_2O_3$ film is not formed on the surface of the tool. On the other hand, in the case where the amount of Al exceeds 1.0%, an $A_3$ point (transformation point at which a phase is transformed from a ferrite into an austenite) becomes high, and the phase transformation does not occur with the high-frequency hardening. Thus, the amount of Al is set to be in the range of over 0.1% to 1.0%. It is preferable to set the amount of Al in the range of 0.12% to 0.8%. It is more preferable to set the amount of Al in the range of 0.14% to 0.4%.

N: 0.001% to 0.02%

N is an element that forms AlN, and contributes to preventing the crystal grain from coarsening. In the case where the amount of N is less than 0.001%, the effect of addition of N cannot be obtained. On the other hand, in the case where the amount of N exceeds 0.02%, hot shortness occurs at the time of rolling. Thus, the amount of N is set to be in the range of 0.001% to 0.02%. It is preferable to set the amount of N in the range of 0.002% to 0.012%. It is more preferable to set the amount of N in the range of 0.004% to 0.008%.

P: 0.05% or Less

The amount of P added may be set to 0%, or may be set to more than 0%. In the case where the appropriate amount of P is added, P contributes to improving the machinability of the steel. In the case where the amount of P exceeds 0.05%, the hardness of the steel excessively increases, which reduces the workability. Thus, the amount of P is set to 0.05% or less. From the viewpoint of machinability, it is preferable to set the amount of P to 0.005% or more. It is more preferable to set the amount of P in the range of 0.008% to 0.02%.

In addition to the elements described above, the steel according to the present invention may only contain iron and inevitable impurities. Further, the steel according to the present invention may contain other elements as selective components within the amount in which the characteristics of the steel according to the present invention are not impaired. Note that the selective components will be described later.

In the steel according to the present invention, [C], [Si], [Mn], and [Al] satisfy the following Expressions (1) and (2).

First, Expression (1) will be described.

The steel for high-frequency hardening contains a large amount of C (usually, 0.4 mass % or more) in order to obtain the surface hardness after high-frequency hardening. Thus, the hardness of the steel for high-frequency hardening is high, deteriorating the machinability. To solve this problem, the present inventors examined the following two types of relationships in terms of the hardness of the steel for high-frequency hardening.

(a1) Relationship between hardness and carbon equivalent that has a large effect on the hardness (a2) Relationship between hardness and machinability affected by the hardness The carbon equivalent Ceq is defined as $Ceq=[C]+1/7 \times [Si]+1/5 \times [Mn]$, by focusing on the effect of C, Si, and Mn on the hardness. In the case where Cr is contained as the selective element, the carbon equivalent Ceq is defined as $Ceq=[C]+1/7 \times [Si]+1/5 \times [Mn]+1/9 \times [Cr]$.

The relationship between the hardness and the carbon equivalent was examined in the following manner.

Plural hot rolling steel bars having a diameter of 65 mm were prepared, in which the hot rolling steel bars contain C: 0.45% to less than 0.75%, Si: 0.05% to 2.00%, Mn: 0.25% to 1.8%, S: 0.005% to 0.1%, P: 0.05% or less, N: 0.0030% to 0.0100%, and Al: over 0.03% to 1.0%, and in the case where the hot rolling steel bars contain Cr, further contain Cr: 0.01% to 0.8%. Further, the hot rolling steel bars satisfy $0.65 \leq Ceq \leq 1.02$. After being hot rolled, the steel materials were kept at 900° C. for one hour, then, were air-cooled, and were cut by a cross-section in the direction of diameter. These obtained test pieces were embedded in resins, the resins were polished, and then, Vickers hardness was measured for the polished resins at a position located at ¼ of the diameter. FIG. 1 shows the results of the measurement. From FIG. 1, it can be understood that the Ceq and the hardness (Hv) have a relationship according to the following Expression (a1).

$$\text{Hardness}(Hv)=214 \times Ceq+49 \qquad (a1)$$

For the relationship between the hardness and the machinability, the amount of Al that generates $Al_2O_3$ to form an $Al_2O_3$ film on the surface of the tool was changed in the range of 0.03% to 1.0%, and examination was made in the following manner.

Square test pieces with a size of 40×40×250 mm were cut out from the steel bars, and cutting tests were performed to the test pieces using a fly tool as a simulation for hobbing of a gear. Note that a cutter used in a hobbing process at the time of manufacturing products includes plural cutting teeth. On the other hand, the fly tool is a cutter only having one hobbing tooth. It has been confirmed that cutting results obtained by the fly tool and those obtained by the cutter including plural cutting teeth exhibit a favorable relationship. Thus, the fly tool is used in a test in lieu of the hob cutter. The test method for the fly tool cutting is described in detail, for example, in "TOYOTA Technical Review Vol. 52 No. 2 December 2002 P78." Table 1 shows test conditions.

[Table 1]

Figure 2:
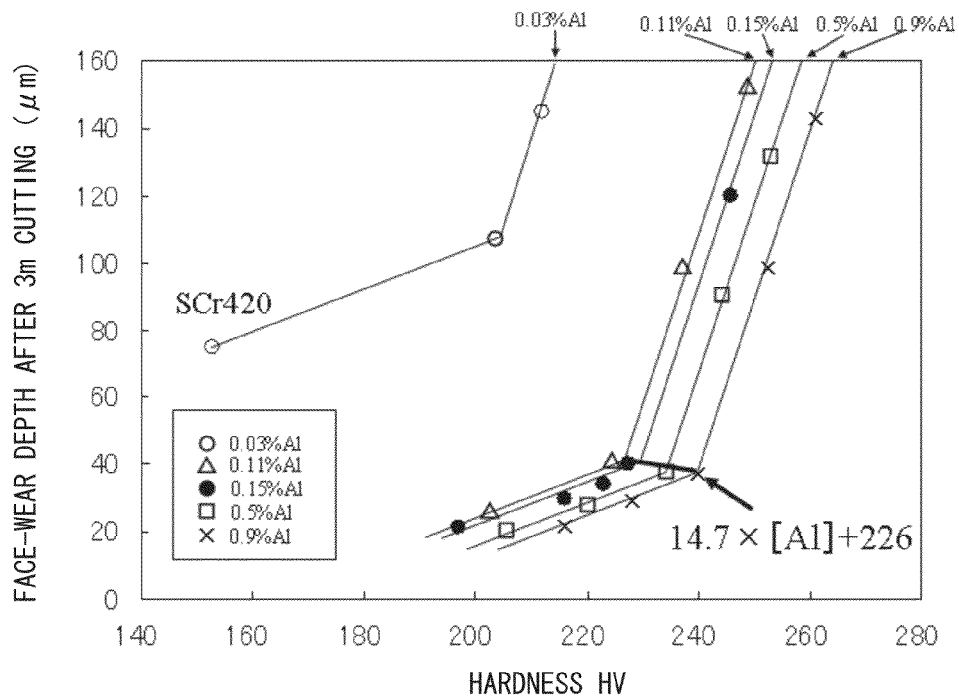
FIG. 2 is a diagram illustrating a relationship between the amount of Al contained in a steel, the hardness (Hv) of the steel, and machinability (face wear [μm] after cutting 3 m).

After the test pieces were cut for three minutes, the maximum face-wear depth (crater wear depth) of the tool was measured with a contact-type roughness meter. FIG. 2 shows the results of the measurement. The minimum wear amount was about 75 μm in the case where JIS-SCr420 (Al: 0.03%) used for a carburized gear is cut under this condition. Thus, the machinability is considered to be favorable if the amount of wear of the test samples is 75 μm or less under the same condition.

As illustrated in FIG. 2, there is a broken point in the relationship between the hardness and the machinability. Once the hardness reaches the broken point, the machinability sharply drops. The present inventors made a study by focusing on the existence of this broken point, and found that the broken point can be expressed by a mathematical expression of 14.7×[Al]+226 in the case of a steel containing Al in the range of over 0.1% to 1.0%.

In other words, the present inventors found that significantly excellent machinability can be obtained if the hardness (Hv) of the steel and the amount of Al [Al] (mass %) in the steel satisfy the following Expression (a2). This is the fundamental finding of the present invention.

$$\text{Hardness}(Hv) \leq 14.7 \times [Al] + 226 \quad (a2)$$

From Expression (a1) and Expression (a2), the following expression can be obtained.

$$214 \times Ceq + 49 \leq 14.7 \times [Al] + 226 \quad (1''')$$

Substituting the expression of the carbon equivalent in the above-described expression yields the following expression.

$$214 \times [C] + 30.6 \times [Si] + 42.8 \times [Mn] - 14.7 \times [Al] \leq 177 \quad (1')$$

The above-described Expression (1') means that, in the steel for high-frequency hardening having the large amount of C (normally, 0.4 mass % or more), the desired hardness and machinability can be obtained by associating [C], [Si], [Mn], and [Al] with each other. Thus, with the steel for a machine structure according to the present invention, the problem of high hardness and less machinability can be solved by forming the composition of the steel so as to satisfy the above-described Expression (1').

In the case where the steel contains Cr, the following expression can be obtained in a similar manner to Expression (1'') and Expression (1').

$$214 \times [C] + 30.6 \times [Si] + 42.8 \times [Mn] + 23.8 \times [Cr] - 14.7 \times [Al] \leq 177 \quad (6')$$

In the case where the steel for a machine structure is used for high-strength machine parts, the steel needs to have hardness of about 200 Hv or more, and hence, Ceq needs to be 0.72 or more from FIG. 1. In other words, the steel according to the present invention needs to have components that also satisfy the following Expression (2) and/or Expression (7).

In other words, in the case where the steel does not contain Cr, the steel also needs to satisfy the following Expression (2).

$$0.72 \leq [C] + 1/7 \times [Si] + 1/5 \times [Mn] < 1.539 \quad (2)$$

In the case where the steel contains Cr, the steel also needs to satisfy the following Expression (7).

$$0.72 \leq [C] + 1/7 \times [Si] + 1/5 \times [Mn] + 1/9 \times [Cr] < 1.627 \quad (7)$$

The value of Ceq of Expression (2) and Expression (7) is set preferably to 0.74 or more, more preferably to 0.76 or more, yet more preferably to 0.79 or more, yet more preferably to 0.82 or more. The upper limit of Ceq is determined on the basis of the upper limits of C, Si, Mn, and Cr.

It should be noted that, since the lower limits of Expression (2) and Ceq of Expression (2) are 0.72, and the upper limit of [Al] is 1.0%, the lower limits of Expression (1') and Expression (5') can be determined as follows:

$$214 \times 0.72 - 14.7 \times 1.0 = 139.38 \quad (1'''')$$

In other words, Expression (1) and Expression (6) can be expressed as follows:

$$139.38 \leq 214 \times [C] + 30.6 \times [Si] + 42.8 \times [Mn] - 14.7 \times [Al] \leq 177 \quad (1)$$

$$139.38 \leq 214 \times [C] + 30.6 \times [Si] + 42.8 \times [Mn] + 23.8 \times [Cr] - 14.7 \times [Al] \leq 177 \quad (6)$$

The upper limits of Expression (1) and Expression (6) are preferably set to 163 or less, more preferably to 155 or less.

In the steel according to the present invention, it is preferable that [C], [Si], [Mn], and [Al] satisfy either one of or both of the above-described Expression (3) and Expression (4).

Next, Expression (3) will be described.

The steel for a machine structure used by applying conventional high-frequency hardening has a problem in that, since high-frequency hardening is applied as the heat-hardening to a gear in an accelerated manner within a short period of time, the hardness varies depending on positions or sufficient hardness after the hardening cannot be obtained. To solve these problems, the present inventors examined a relationship between an index A related to C and Mn that have an effect on the microstructure of the steel and a pro-eutectoid α fraction that has an effect on the hardenability of the steel. Since the high frequency heating is applied within a short period of time, C atoms do not disperse over the entire ferrite portions at the time of high frequency heating if the pro-eutectoid area is large. This leads to generation of a martensite having a lower hardness, possibly causing hardness variation or insufficient hardness of the steel. The examination above was made in the following manner.

Figure 3A:
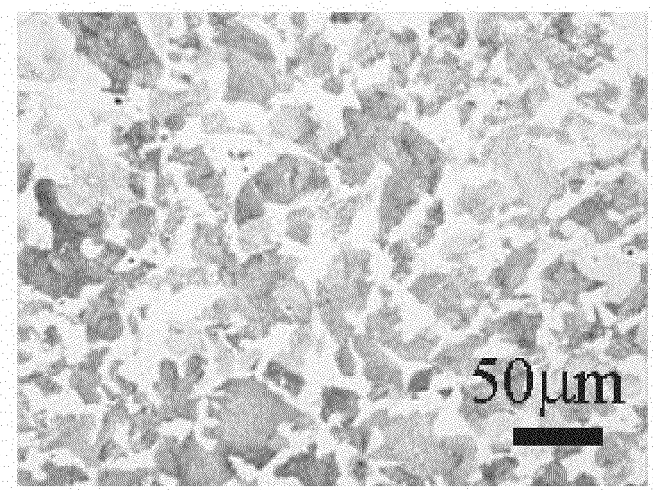
FIG. 3A illustrates a microstructure that has a large ferrite area and is not preferable as a steel for a machine structure.
Figure 3B:
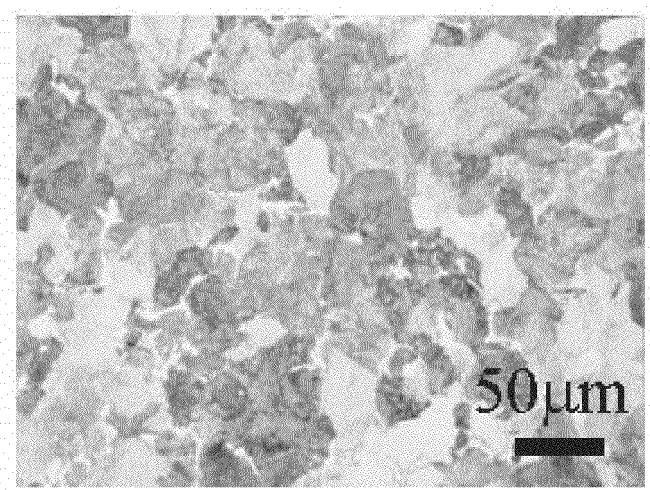
FIG. 3B illustrates a microstructure that has a small ferrite area and is preferable as a steel for a machine structure.

After being subjected to a condition of 900° C.×1 hour, the steel bar was air-cooled. Test pieces having a large diameter portion 26ϕ were cut out from the steel bar. The cut-out test pieces were cut by a cross-section in the diameter direction, and were embedded into resins. The surfaces of the resins were polished, and were subjected to etching with a nital solution. Then, microstructures on the surfaces were observed with an optical microscope. FIG. 3A and FIG. 3B show an example of the observation results.

In FIG. 3A and FIG. 3B, white areas are ferrite, and black areas are pearlite. In other words, FIG. 3A illustrates a microstructure that has large ferrite areas and is not favorable as the steel for a machine structure, and FIG. 3B illustrates a microstructure that has a small ferrite area and is favorable as the steel for a machine structure.

Figure 4:
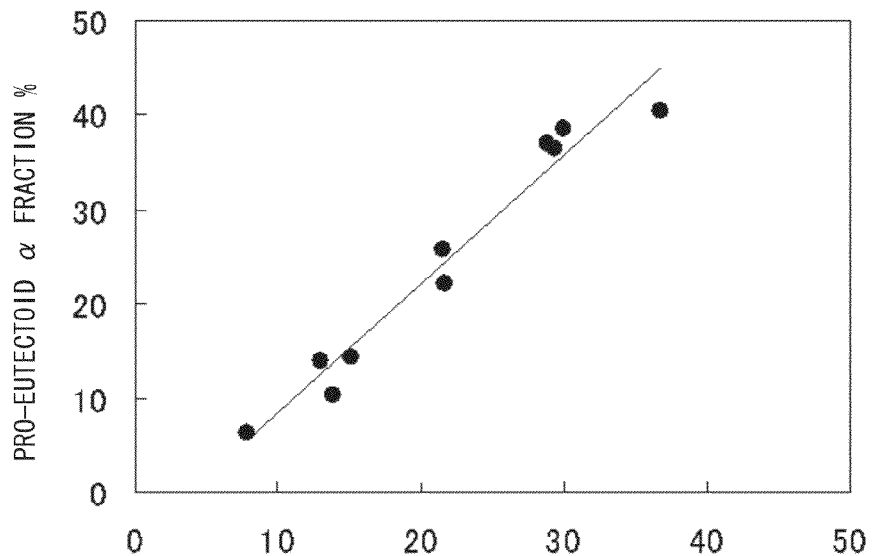
FIG. 4 is a diagram illustrating a relationship between a pro-eutectoid α fraction (%), an index A (=113−135×[C]−27×[Mn]), and an index A (=113−135×[C]−27×[Mn]−18×[Cr]).

FIG. 4 illustrates a relationship between a pro-eutectoid α fraction (%), and an index A (=113−135×[C]−27×[Mn]) and an index A (=113−135×[C]−27×[Mn]−18×[Cr]).

The present inventors define, as the following expressions, the index A used for taking the effect of C, Mn and Cr on the microstructure of the steel into consideration.

In the case where the steel does not contain Cr, index A=113−135×[C]−27×[Mn] . . . (3') is given, and in the case where the steel contains Cr, index A=113−135×[C]−27×[Mn]−18×[Cr] . . . (8') is given.

Coefficients included in these expressions were obtained in the following manner. Various steel materials containing C: 0.40% to less than 0.75%, Mn: 0.1% to 1.8%, and Cr: 0.01% to 0.8% were prepared, and microstructures of the steel materials were observed in the following method to obtain the pro-eutectoid α fraction. Further, effects of the amounts of C, Mn, and Cr contained in the steel material on the pro-eutectoid α fraction were obtained through a multiple regression analysis to calculate the coefficients in the index A. Note that the pro-eutectoid α fraction was obtained in a manner such that 20 views were photographed with an optical microscope with a magnification of 400 power (view with a size of about 0.32 mm×0.24 mm), areas of ferrite portions were measured through an image analysis, and a ratio of the areas of the ferrite portions relative to the entire area photographed was calculated.

From FIG. 4, it can be understood that the pro-eutectoid α fraction (%) linearly increases with the increase in the value of the index A.

In order to obtain favorable hardenability with the accelerated high-frequency hardening applied within a short period of time, it is preferable to set the pro-eutectoid α fraction to 13% or less. To this end, it is preferable to set the index A to 13 or less. Thus, the following Expression (3), which associates [C] and [Mn] with each other, can be obtained.

$$113-135\times[C]-27\times[Mn]\leq 13 \quad (3)$$

In other words, by setting [C] and [Mn] in the steel for high-frequency hardening so as to satisfy Expression (3) described above, it is possible to reduce the variation in hardness after the hardening and prevent insufficient hardness after the hardening.

In the case where the steel contains Cr, the following Expression (7) can be obtained by measuring the pro-eutectoid α fraction in the steel material containing Cr: 0.01% to 0.8% in a similar manner to that described above.

$$113-135\times[C]-27\times[Mn]-18\times[Cr]\leq 13 \quad (8)$$

In other words, by setting [C], [Mn], and [Cr] contained in the steel for high-frequency hardening so as to satisfy the above-described Expression (8), it is possible to reduce the variation in hardness after the hardening and prevent insufficient hardness after the hardening.

It should be noted that the left-hand side of each of Expression (3) and Expression (8) is preferably 11 or less, more preferably 9 or less. If the left-hand side of Expression (3) and Expression (8) is 3.75 or less, the pro-eutectoid ferrite does not exist.

Although it is not necessary to set the lower limit value for the left-hand side of Expression (3) and Expression (8), the theoretical lower limit value calculated from the component range of each element is −51.25.

The above-described Expression (4) will be described. The steel for a machine structure used by applying conventional high-frequency hardening has the following problem. More specifically, in many cases, parts subjected to the conventional high-frequency hardening have the surface layer containing C in the range of 0.4% to 0.6 mass %, and exhibit lower fatigue strength, as compared with the carburized part having the surface layer containing C of about 0.8%. Thus, the present inventors made a study to solve this problem in the following manner.

In terms of characteristics of the steel for high-frequency hardening, the tempered hardness after the hardening is important to improve the pitting fatigue strength of the part. The present inventors introduced the following index RT to quantitatively evaluate the tempered hardness after the high-frequency hardening so as to associate the tempered hardness with the components of the steel.

In the case where the steel does not contain Cr, the RT is defined by the following Expression (4').

$$RT=33+31\times[C]+4.5\times[Si]+1.5\times[Mn] \quad (4')$$

In the case where the steel contains Cr, the RT is defined by the following Expression (9').

$$RT=33+31\times[C]+4.5\times[Si]+1.5\times[Mn]+2.4\times[Cr] \quad (9')$$

The index RT is an index that additively evaluates how much [C], [Si], [Mn], and [Cr] have an effect on the tempered hardness after the hardening, by putting a weight to the degree of influence that each of the elements has. Note that C, Si, Mn, and Cr are primary elements that increase the hardness of the steel.

Figure 5:
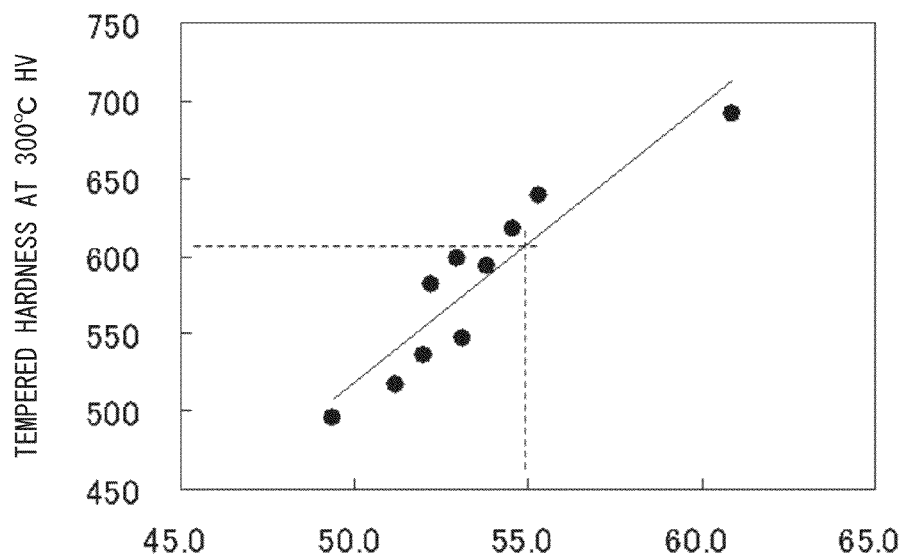
FIG. 5 is a diagram illustrating a relationship between tempered hardness (Hv) at 300° C., and an index RT (33+31×[C]+4.5×[Si]+1.5×[Mn]) and an index RT (33+31×[C]+4.5×[Si]+1.5×[Mn]+2.4×[Cr]).

After being subjected to a condition of 900° C.×1 hour, the steel bar was air-cooled. Test pieces having a large diameter portion 26φ were cut out from the steel bar. The large diameter portion was subjected to the high-frequency hardening so that the depth of the effective case-hardening layer was 1.5 mm, and then, was subjected to a tempering process under the condition of 300° C.×90 minutes. After this, the large diameter portion was cut by a cross-section in the diameter direction, and was embedded into a resin. Then, after the surface layer of the resin was polished, Vickers hardness (Hv) was measured at a position of 0.05 mm from the surface layer. FIG. 5 shows the results.

From FIG. 5, it can be determined that the index RT and the tempered hardness (Hv) at 300° C. exhibit a significantly favorable correlation, and the hardness of 610 Hv or more can be obtained if the RT is more than or equal to 55.

Through a roller pitting test, the present inventors confirmed that the fatigue strength is excellent if the tempered hardness (Hv) at 300° C. is 610 Hv or more.

Roller pitting test pieces having a large diameter portion (test portion) 26φ produced from the steel bar were subjected to high-frequency hardening so that the large diameter portion includes the effective case-hardening layer having a depth of 1.5 mm. Further, the roller pitting test pieces were subjected to a tempering process of 160° C.×90 minutes. Then, a grip portion was subjected to a finishing process to increase the accuracy of the test.

Figure 6:
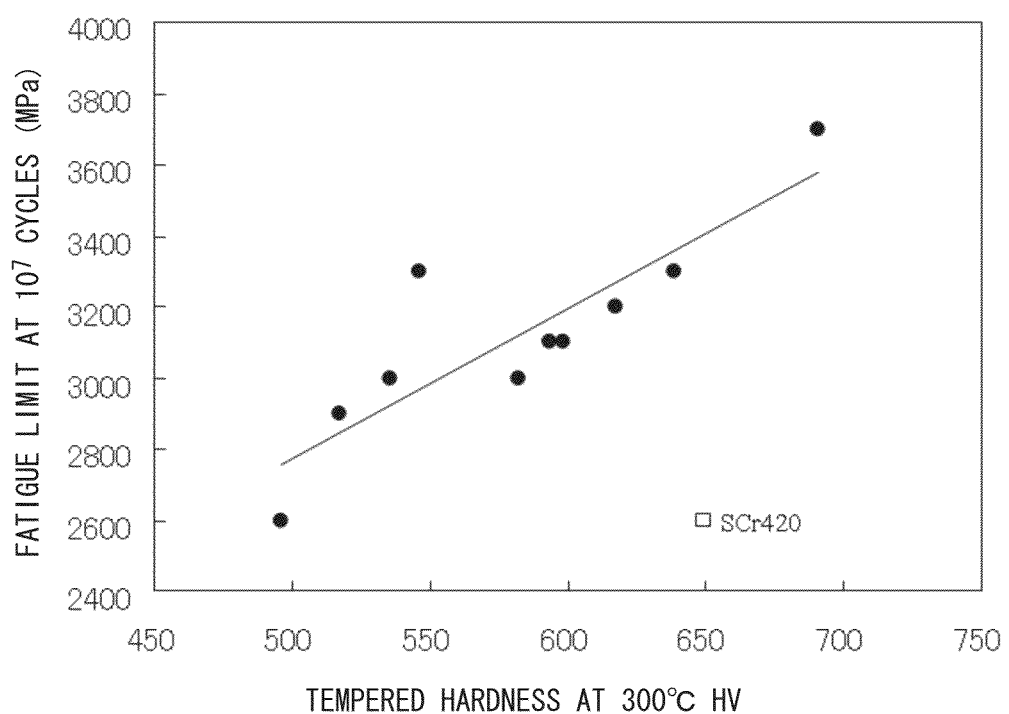
FIG. 6 is a diagram illustrating a relationship between tempered hardness (Hv) at 300° C. and a fatigue limit (MPa) at $10^7$ cycles.

The roller pitting test was performed under the conditions in which a large roller was formed by an SCM 420 carburized roller with crowning of 150R; the number of rotations was 2000 rpm; a transmission oil was used as a lubricating oil; an oil temperature was 80° C.; a slip ratio was −40%; and the maximum cycle was 10,000,000. On the basis of the test, an S—N curve was created to obtain a fatigue limit (MPa, roller pitting fatigue strength). FIG. 6 shows the results of the test.

For comparison purposes, the fatigue limit at $10^7$ cycles was obtained for JIS-SCr420, which is widely used for carburized gears, and is shown in the drawing. The fatigue limit at $10^7$ cycles of JIS-SCr420 was 2600 MPa. The target value of the fatigue limit (roller pitting fatigue strength) of the steel according to the present invention was set to 3200 MPa or more, which is about 20% higher than that of JIS-SCr420.

From FIG. 6, it can be understood that, in order to obtain the fatigue limit of 3200 MPa or more, it is necessary to obtain the tempered hardness at 300° C. of 610 Hv or more. From FIG. 5, it can be understood that, in order to obtain the tempered hardness at 300° C. of 610 Hv or more, it is necessary to keep the index RT of 55 or more. In other words, by setting the index RT≥55, it is possible to obtain the favorable fatigue strength.

It should be noted that the upper limit of the index RT can be determined depending on the upper limit of C, Si, Mn, and Cr. In other words, Expression (4) and Expression (9) are given as below.

$$55\leq 33+31\times[C]+4.5\times[Si]+1.5\times[Mn]<72.45 \quad (4)$$

$$55\leq 33+31\times[C]+4.5\times[Si]+1.5\times[Mn]+2.4\times[Cr]<74.37 \quad (9)$$

In order to obtain much higher strength, it is preferable to set the RT to be not less than 57, and it is more preferable to set the RT to be not less than 59.

As described above, according to the steel of the present invention, the problems are solved by defining the components therein using Expressions (1), (2), (3), and (4) described above. Thus, the steel according to the present invention exhibits excellent characteristics as a steel for a high-frequency hardening for use in a high-strengthened part.

$$1.5<[Si]+1.8\times[Mn]<6.24 \quad (5)$$

Si and Mn are elements that are dissolved in solid solution in ferrite, and strengthen ferrite. For the steel for a machine structure required to have a high strength, it is preferable to enhance the strength of ferrite in order to prevent the steel material from breaking from ferrite having a soft structure in the steel. To this end, it is preferable that Si and Mn in total satisfy [Si]+1.8×[Mn]>1.5. Although it is not necessary to particularly set the upper limit of [Si]+1.8×[Mn], the upper limit of [Si]+1.8×[Mn] is determined to be 6.24 or less on the basis of the upper limit of the amount of each of Si and Mn added.

As described above, the steel according to the present invention may contain other elements as selective components within the amount in which the excellent characteristics of the steel according to the present invention are not impaired. Addition of the selected elements is not essential in terms of solving the problems of the present invention. Below, a description will be made of addition of the selected elements and reasons for limitation of selected elements. Note that the unit "%" means mass %.

B: 0.0001% to 0.015%

B is an element that imparts hardenability to the steel, and enhances the strength of the grain boundary. With the small amount of B added, B segregates in a γ grain boundary to enhance the hardenability, and suppress breakage of the grain boundary in the surface layer during the high-frequency hardening. To obtain these effects, it may be possible to add B of not less than 0.0001%. In the case where the amount of B added exceeds 0.015%, the material becomes brittle. Thus, the amount of B added is set in the range of 0.0001% to 0.015%. The amount of B added is set preferably in the range of 0.0005% to 0.010%, more preferably in the range of 0.001% to 0.003%.

One or More Elements of Cr: 0.01% to 0.8%, Mo: 0.001% to 1.0%, Ni: 0.001% to 5.0%, and Cu: 0.001% to 5.0%

Cr, Mo, Ni, and Cu are elements that enhance the strength of the steel. To obtain this effect, it may be possible to add Cr of not less than 0.01%, Mo of not less than 0.001%, Ni of not less than 0.001%, and/or Cu of not less than 0.001% within the amount in which addition of these elements does not impair the excellent characteristics of the steel according to the present invention.

In the case where the amount of Cr exceeds 0.8%, the hardenability excessively improves. This leads to generation of bainite or insular martensite, deteriorating the workability. Thus, the amount of Cr contained is set to be not more than 0.8%, preferably to be not more than 0.4%. In the case where Mo exceeds 1.0%, the hardenability excessively improves as in Cr. This leads to generation of bainite or insular martensite, deteriorating the workability. The amount of Mo is set to be not more than 1.0%, preferably to be not more than 0.5%, more preferably to be not more than 0.2%, yet more preferably to be less than 0.05%.

In the case where the amount of Ni and Cu exceeds 5.0%, the hardenability excessively improves as with Cr and Mo. This leads to generation of bainite or insular martensite, deteriorating the workability. Thus, the upper limit of the amount of each of Ni and Cu contained is set to be not more than 5.0%.

One or More Elements of Ca: 0.0001% to 0.02%, Mg: 0.0001% to 0.02%, Zr: 0.0001% to 0.02%, and Rem: 0.0001% to 0.02%

Ca, Mg, Zr, and a rare earth metal (Rem) are elements that control the formation of MnS in the steel, and contribute to improving the mechanical properties of the steel. To obtain these effects, it may be possible to add each of Ca, Mg, Zr, and Rem of not less than 0.0001% within the amount in which addition of Ca, Mg, Zr, and Rem does not impair the excellent characteristics of the steel according to the present invention. In the case where the amount of each of Ca, Mg, Zr, and Rem exceeds 0.02%, oxides coarsen, and the fatigue strength deteriorates. Thus, the amount of each of Ca, Mg, Zr, and Rem is set to be not more than 0.02%. Note that Rem represents a rare earth metal element, and includes one or more elements selected from Sc, Y, La, Ce, Pr, Nd, Pm, Sm, Eu, Gd, Tb, Dy, Ho, Er, Tm, Yb, and Lu.

One or More Elements of Ti: 0.005% to 0.5%, Nb: 0.0005% to 0.5%, W: 0.0005% to 0.5%, V: 0.0005% to 0.5%, Ta: 0.0001% to 0.2%, and Hf: 0.0001% to 0.2%

Ti, Nb, Ta, and Hf suppress the undesirable growth of the crystal grain, and contribute to homogenization of the structure. To obtain these effects, it may be possible to add Ti of not less than 0.005%, Nb of not less than 0.0005%, Ta of not less than 0.0001%, and Hf of not less than 0.0001% within the amount in which addition of Ti, Nb, Ta, and Hf does not impair the excellent characteristics of the steel according to the present invention.

On the other hand, in the case where the amount of each of Ti and Nb exceeds 0.5% or the amount of each of Ta and Hf exceeds 0.2%, hard carbides are generated, which leads to deterioration in the machinability. Thus, the amount of each of Ti and Nb is set to be not more than 0.5%, and the amount of each of Ta and Hf is set to be not more than 0.2%.

W and V form fine carbides, nitrides, and/or carbonitrides with C and/or N, preventing the crystal grain from coarsening and contributing to homogenization of the structure of the steel. To obtain these effects, it may be possible to add W of not less than 0.0005% and/or V of not less than 0.0005% within the amount in which addition of these elements does not impair the excellent characteristics of the steel according to the present invention. If either one of W and V exceeds 0.5%, hard carbides are generated, which leads to deterioration in the machinability. Thus, the amounts of W and V are each set to be not more than 0.5%.

One or More Elements of Sb: 0.0001% to 0.015%, Sn: 0.0005% to 2.0%, Zn: 0.0005% to 0.5%, Te: 0.0003% to 0.2%, Se: 0.0003% to 0.2%, Bi: 0.001% to 0.5%, and Pb: 0.001% to 0.5%

Sb, Te, Se, Bi, and Pb are elements that enhance the machinability. To obtain this effect, it may be possible to add Sb of not less than 0.0001%, Te of not less than 0.0003%, Se of not less than 0.0003%, Bi of not less than 0.001%, and/or Pb of not less than 0.001% within the amount in which addition of these elements does not impair the excellent characteristics of the steel according to the present invention.

In the case where Sb exceeds 0.015%, Te exceeds 0.2%, Se exceeds 0.2%, Bi exceeds 0.5%, or Pb exceeds 0.5%, hot shortness occurs, causing damage or making rolling operations difficult. Thus, the amount of Sb is set to be not more than 0.015%, the amount of Te is set to be not more than 0.2%, the amount of Se is set to be not more than 0.2%, the amount of Bi is set to be not more than 0.5%, and the amount of Pb is set to be not more than 0.5%.

Sn and Zn are elements that make ferrite brittle to prolong the tool life, and improve the surface roughness. To obtain these effects, it may be possible to add each of Sn and Zn of not less than 0.0005% within the amount in which addition of these elements does not impair the excellent characteristics of the steel according to the present invention. In the case where Sn exceeds 2.0% or Zn exceeds 0.5%, it is difficult to produce the steel. Thus, the amount of Sn is set to be not more than 2.0%, and the amount of Zn is set to be not more than 0.5%.

One or More Elements of Li: 0.00001% to 0.005%, Na: 0.00001% to 0.005%, K: 0.00001% to 0.005%, Ba: 0.00001% to 0.005%, and Sr: 0.00001% to 0.005%

Li, Na, K, Ba, and/or Sr each form oxide, and the formed oxide is captured by $CaO-Al_2O_3-SiO_2$-based oxide to form oxide having a low melting point. The resulting oxide adheres, as belag, to the surface of a tool used at the time of cutting operations, thereby improving the machinability. To obtain this effect, it may be possible to add each of these elements of not less than 0.00001% within the amount in which addition of these elements does not impair the excellent characteristics of the steel according to the present invention.

In the case where the amount of each of these elements exceeds 0.005%, refractories retaining the molten steel may melt and be damaged. Thus, the amounts of Li, Na, K, Ba, and Sr are each set to be not more than 0.005%.

The steel according to the present invention has components as described above, with a balance including Fe and inevitable impurities. Note that, although inevitable impurities such as As and Co may intrude into the steel depending on raw materials, tools, production equipment or other factors, intrusion of these inevitable impurities is allowable provided that the amount of the inevitable impurities intruded falls within the amount in which the intrusion of the inevitable impurities does not impair the excellent characteristics of the steel according to the present invention.

EXAMPLES

Next, Examples of the present invention will be described. Conditions used in Examples are merely examples of the conditions, and are employed to demonstrate feasibility and effects of the present invention. The present invention is not limited to these examples of conditions. It may be possible to employ various conditions that do not depart from the scope of the present invention and can achieve the object of the present invention.

Examples

Steels having components shown in Table 2 and Table 3 were produced through melting, and were rolled to form a steel bar with 65φ. Tables 4 to 6 show values of Expression (1), values of Expression (2), values of Expression (3), values of Expression (4), and values of Expression (5) in connection with steels of Number 1 to Number 105. For the steel containing Cr, values of Expression (6), values of Expression (7), values of Expression (8), and values of Expression (9) are shown. Steels of Number 1 to Number 94 correspond to examples of the present invention, and steels of Number 95 to Number 105 correspond to comparative examples.

After being subjected to a condition of 900° C.×1 hour, the steel bars were air-cooled, and test pieces were cut out from the steel bar. Before hardening, measurement was made of hardness (Hv), the amount of wear (m) of the tool, and proeutectoid ferrite fraction (%). The results of measurement are shown in Table 4 to Table 6. Further, after the hardening, measurement was made of the tempered hardness (Hv) at 300° C. of the hardened layer and the roller pitting fatigue strength (fatigue limit, MPa). The results of the measurement are shown in Table 4 to Table 6. Note that the amount of wear (μm) of the tool was obtained such that the test piece with 3 m was cut, and the maximum crater wear depth of the tool was measured with a contact-type roughness meter. In Table 2 to Table 6, underlines are applied for components or expressions that do not satisfy the conditions of the present invention.

[Table 2]
[Table 3]
[Table 4]
[Table 5]
[Table 6]

The steels of Number 95 and Number 96 did not satisfy Expression (1) or Expression (6), and hence, the amount of wear of the tool was large.

The steel of Number 97 did not satisfy Expression (2), and hence, the hardness was low. Thus, the steel of Number 97 could not be used as the steel for a machine structure for use in the high-strength machine part.

The amount of Al added was not sufficient for the steels of Number 98 and Number 99, and hence, no $Al_2O_3$ film was formed on the surface of the tool, which resulted in the increase in the amount of wear of the tool.

The excessive amount of Al was added to the steel of Number 100, which resulted in the increase in the $A_3$ point. Thus, the high-frequency hardening could not be applied.

The amount of Mn added to the steel of Number 101 was excessive, which resulted in deterioration in the workability, and an increase in the amount of wear of the tool.

The amount of Cr added to the steel of Number 102 was excessive, which resulted in deterioration in the workability, and an increase in the amount of wear of the tool.

The amount of N added to the steel of Number 103 was excessive. Hence, hot shortness occurred in the steel bar during rolling, and hence, this steel could not be used for production.

The amount of C added was not sufficient for the steel of Number 104, which resulted in insufficient surface hardness after the high-frequency hardening.

The amount of C added to the steel of Number 105 was excessive, which resulted in the occurrence of season cracking.

The steels of Number 1 to Number 94 had components that satisfy Expression (1), Expression (2), Expression (6), and Expression (7). Thus, these steels had the desired characteristics

INDUSTRIAL APPLICABILITY

As described above, according to the present invention, it is possible to provide a steel for a machine structure that exhibits excellent machinability and can be used for a high-strength part exhibiting excellent fatigue characteristics. Thus, the present invention is highly applicable in the machine-manufacturing industry.

TABLE 1

| | | |
|---|---|---|
| Conditions for cutting work | Speed | 150 m/min |
| | Feed | 0.12 mm/rev |
| | Amount of shift | 1.8 mm |
| | Cutting depth | 4.5 mm |
| | Oil for cutting work | Not applied (dry) |
| Tool | Type | Fly tool (φ90) |
| | Material | High-speed steel (made by Nachi-Fujikoshi) |
| | Coating | TiAlN (no cutting face) |
| Equipment | | Holizontal machining center |

TABLE 2

| Number | Components (mass %) | | | | | | | | | | | |
|---|---|---|---|---|---|---|---|---|---|---|---|---|
| | C | Si | Mn | P | S | Al | N | B | Cr | Mo | Ni | Cu |
| 1 | 0.65 | 0.05 | 0.40 | 0.009 | 0.017 | 0.130 | 0.0050 | | | | | |
| 2 | 0.55 | 0.85 | 0.25 | 0.015 | 0.015 | 0.110 | 0.0050 | | 0.11 | | | |
| 3 | 0.60 | 0.65 | 0.20 | 0.013 | 0.018 | 0.145 | 0.0043 | | | | | |
| 4 | 0.40 | 0.45 | 1.45 | 0.010 | 0.014 | 0.115 | 0.0045 | 0.0040 | | | | |
| 5 | 0.45 | 1.20 | 0.55 | 0.014 | 0.020 | 0.200 | 0.0055 | 0.0011 | | | | |
| 6 | 0.50 | 0.25 | 1.00 | 0.019 | 0.023 | 0.560 | 0.0060 | | | | | |
| 7 | 0.47 | 0.50 | 0.91 | 0.009 | 0.023 | 0.150 | 0.0040 | | | 0.04 | | |
| 8 | 0.63 | 0.05 | 0.73 | 0.010 | 0.072 | 0.149 | 0.0110 | | | | | |
| 9 | 0.65 | 0.10 | 0.73 | 0.007 | 0.011 | 0.150 | 0.0016 | 0.0020 | | 0.25 | | |
| 10 | 0.65 | 0.11 | 0.72 | 0.013 | 0.018 | 0.145 | 0.0043 | 0.0019 | | 0.04 | | |
| 11 | 0.64 | 0.03 | 0.10 | 0.015 | 0.016 | 0.110 | 0.0100 | | 0.70 | | | |
| 12 | 0.61 | 0.05 | 0.75 | 0.003 | 0.023 | 0.150 | 0.0055 | | | | | |
| 13 | 0.62 | 0.01 | 0.11 | 0.004 | 0.032 | 0.160 | 0.0042 | | | 0.79 | | |
| 14 | 0.52 | 0.05 | 1.25 | 0.007 | 0.080 | 0.152 | 0.0160 | | | | | |
| 15 | 0.41 | 0.60 | 1.77 | 0.010 | 0.015 | 0.350 | 0.0050 | 0.0005 | | | | |
| 16 | 0.51 | 0.60 | 1.25 | 0.006 | 0.035 | 0.430 | 0.0016 | | 0.06 | | | |
| 17 | 0.40 | 0.01 | 1.71 | 0.015 | 0.010 | 0.130 | 0.0045 | 0.0093 | | 0.11 | | |
| 18 | 0.50 | 0.05 | 1.30 | 0.006 | 0.020 | 0.150 | 0.0090 | | | | 1.00 | |
| 19 | 0.51 | 0.05 | 1.25 | 0.003 | 0.014 | 0.150 | 0.0011 | | | | | 0.10 |
| 20 | 0.43 | 0.05 | 1.72 | 0.003 | 0.025 | 0.170 | 0.0050 | | | | | |
| 21 | 0.60 | 0.05 | 0.88 | 0.005 | 0.006 | 0.150 | 0.0110 | | 0.02 | | | |
| 22 | 0.60 | 0.10 | 0.86 | 0.008 | 0.070 | 0.151 | 0.0050 | 0.0028 | | | | |
| 23 | 0.50 | 0.10 | 1.52 | 0.008 | 0.006 | 0.150 | 0.0080 | 0.0004 | | | | |
| 24 | 0.53 | 0.05 | 1.30 | 0.040 | 0.009 | 0.125 | 0.0045 | | 0.03 | | | |
| 25 | 0.56 | 0.05 | 1.10 | 0.015 | 0.015 | 0.300 | 0.0050 | | 0.11 | | | |
| 26 | 0.47 | 0.05 | 1.80 | 0.011 | 0.020 | 0.150 | 0.0040 | | | | | |
| 27 | 0.45 | 0.30 | 1.50 | 0.016 | 0.055 | 0.970 | 0.0110 | 0.0140 | 0.40 | | | |
| 28 | 0.55 | 0.60 | 1.20 | 0.033 | 0.005 | 0.790 | 0.0063 | 0.0110 | 0.01 | | | |
| 29 | 0.59 | 0.10 | 1.08 | 0.010 | 0.030 | 0.115 | 0.0016 | | | | | |
| 30 | 0.60 | 0.30 | 0.95 | 0.018 | 0.090 | 0.250 | 0.0057 | | 0.03 | | | |
| 31 | 0.40 | 0.01 | 1.18 | 0.009 | 0.031 | 0.150 | 0.0035 | | 0.79 | | | |
| 32 | 0.65 | 0.45 | 0.40 | 0.013 | 0.025 | 0.125 | 0.0047 | 0.0019 | | 0.24 | | |
| 33 | 0.62 | 0.67 | 0.22 | 0.008 | 0.070 | 0.150 | 0.0050 | | | | | |
| 34 | 0.71 | 0.01 | 0.10 | 0.020 | 0.019 | 0.130 | 0.0049 | | | | 0.05 | |
| 35 | 0.55 | 1.05 | 0.20 | 0.033 | 0.005 | 0.480 | 0.0063 | | 0.01 | | 0.50 | 0.60 |
| 36 | 0.64 | 1.09 | 0.20 | 0.018 | 0.028 | 0.250 | 0.0180 | | | 0.03 | | |
| 37 | 0.65 | 0.95 | 0.22 | 0.003 | 0.023 | 0.150 | 0.0055 | | | 0.03 | 0.10 | 0.05 |
| 38 | 0.66 | 0.73 | 0.36 | 0.010 | 0.072 | 0.155 | 0.0110 | | | | | |
| 39 | 0.70 | 0.65 | 0.20 | 0.014 | 0.020 | 0.193 | 0.0055 | | | 0.90 | 0.03 | 0.07 |
| 40 | 0.56 | 0.90 | 0.40 | 0.015 | 0.015 | 0.110 | 0.0050 | | 0.11 | 0.40 | 1.00 | 0.10 |
| 41 | 0.45 | 2.10 | 0.25 | 0.006 | 0.020 | 0.150 | 0.0090 | | | | | |
| 42 | 0.60 | 0.77 | 0.43 | 0.018 | 0.090 | 0.250 | 0.0057 | | 0.03 | | 0.73 | |
| 43 | 0.41 | 2.31 | 0.40 | 0.013 | 0.025 | 0.125 | 0.0047 | | | 0.02 | | 0.05 |
| 44 | 0.49 | 1.78 | 0.39 | 0.008 | 0.006 | 0.150 | 0.0080 | | | | | |
| 45 | 0.53 | 1.05 | 0.78 | 0.007 | 0.080 | 0.150 | 0.0160 | | | | | 0.06 |
| 46 | 0.57 | 0.80 | 0.76 | 0.008 | 0.019 | 0.150 | 0.0110 | | | | | |
| 47 | 0.61 | 0.73 | 0.60 | 0.005 | 0.006 | 0.150 | 0.0110 | | 0.02 | | | |
| 48 | 0.47 | 1.45 | 0.77 | 0.010 | 0.014 | 0.115 | 0.0045 | | | | | 0.02 |
| 49 | 0.50 | 1.39 | 0.22 | 0.046 | 0.009 | 0.150 | 0.0045 | | 0.03 | | | |
| 50 | 0.50 | 1.40 | 0.25 | 0.013 | 0.018 | 0.145 | 0.0043 | | | | | |

| Number | Components (mass %) | | | | | | | | | | |
|---|---|---|---|---|---|---|---|---|---|---|---|
| | Ca | Mg | Zr | Rem | Ti | Nb | W | V | Ta | Hf | Others |
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | | | | |
| 19 | | | | | | | | | | | |
| 20 | 0.0012 | | | | | | | | | | |
| 21 | | 0.0020 | | | | | | | | | |

TABLE 2-continued

| Number | | | | | | | | | | | |
|---|---|---|---|---|---|---|---|---|---|---|---|
| 22 | | 0.0020 | | | | | | | | | |
| 23 | | | 0.0010 | | | | | | | | |
| 24 | | | | 0.02 | | | | | | | |
| 25 | | | | | 0.02 | | | | | | |
| 26 | | | | | | | | | | | |
| 27 | | | | | | 0.13 | | | | | |
| 28 | | | | | | | 0.05 | | | | |
| 29 | | | | | | | | 0.10 | | | |
| 30 | | | | | | | | | 0.10 | | |
| 31 | | | | | | | | | | Sn: 0.09 | |
| 32 | | | | | | | | | | Te: 0.001 | |
| 33 | | | | | | | | | | | |
| 34 | | | | | | | | | | | |
| 35 | | | | | | | | | | | |
| 36 | | | | | | | | | | | |
| 37 | | | | | | | | | | | |
| 38 | | | | | | | | | | | |
| 39 | | | | | | | | | | | |
| 40 | | | | | | | | | | | |
| 41 | 0.0020 | 0.0023 | 0.0015 | 0.0001 | | | | | | | |
| 42 | | | | | 0.008 | | | | | | |
| 43 | | | | | | 0.005 | | | | | |
| 44 | | | | | | | | | | | |
| 45 | | 0.0035 | | 0.0004 | 0.02 | | 0.15 | | | | |
| 46 | | | | | | 0.01 | | 0.23 | | | |
| 47 | 0.0025 | | 0.0007 | | | | 0.43 | | 0.06 | | |
| 48 | | 0.0100 | | | 0.005 | | 0.01 | | 0.01 | Li: 0.0001 | |
| 49 | | | | | | | | | | | |
| 50 | | | | | | | | | | | |

TABLE 3

| | Component (mass %) | | | | | | | | | | | |
|---|---|---|---|---|---|---|---|---|---|---|---|---|
| Number | C | Si | Mn | P | S | Al | N | B | Cr | Mo | Ni | Cu |
| 51 | 0.40 | 1.69 | 0.10 | 0.011 | 0.010 | 0.120 | 0.0070 | | 0.79 | | | |
| 52 | 0.57 | 0.88 | 0.38 | 0.013 | 0.040 | 0.150 | 0.0120 | | | | | |
| 53 | 0.48 | 1.73 | 0.22 | 0.016 | 0.051 | 0.970 | 0.0110 | | 0.40 | | | |
| 54 | 0.55 | 1.02 | 0.50 | 0.019 | 0.023 | 0.600 | 0.0060 | | | | | |
| 55 | 0.40 | 2.10 | 0.10 | 0.003 | 0.023 | 0.110 | 0.0050 | | | | | |
| 56 | 0.44 | 2.45 | 0.21 | 0.010 | 0.015 | 0.350 | 0.0050 | | | | | |
| 57 | 0.52 | 1.74 | 0.38 | 0.006 | 0.035 | 0.430 | 0.0016 | | 0.06 | | | |
| 58 | 0.56 | 1.36 | 0.40 | 0.013 | 0.040 | 0.150 | 0.0120 | | 0.01 | | | |
| 59 | 0.61 | 1.01 | 0.37 | 0.006 | 0.050 | 0.150 | 0.0048 | | | | | |
| 60 | 0.45 | 2.97 | 0.10 | 0.011 | 0.020 | 0.990 | 0.0040 | | | | | |
| 61 | 0.65 | 0.25 | 0.50 | 0.007 | 0.011 | 0.150 | 0.0016 | 0.0020 | | | | |
| 62 | 0.65 | 0.59 | 0.50 | 0.018 | 0.028 | 0.250 | 0.0180 | | | | | |
| 63 | 0.73 | 0.60 | 0.10 | 0.010 | 0.019 | 0.150 | 0.0039 | | | | | |
| 64 | 0.69 | 0.57 | 0.25 | 0.006 | 0.035 | 0.405 | 0.0016 | | 0.06 | | | |
| 65 | 0.67 | 0.21 | 0.49 | 0.035 | 0.070 | 0.150 | 0.0050 | | | | | |
| 66 | 0.71 | 0.29 | 0.25 | 0.002 | 0.060 | 0.150 | 0.0016 | | | | | |
| 67 | 0.69 | 0.40 | 0.40 | 0.003 | 0.014 | 0.150 | 0.0011 | | | | | |
| 68 | 0.73 | 0.39 | 0.20 | 0.008 | 0.019 | 0.150 | 0.0110 | | | | | |
| 69 | 0.73 | 0.04 | 0.25 | 0.009 | 0.070 | 0.141 | 0.0037 | | | | | |
| 70 | 0.74 | 0.05 | 0.20 | 0.010 | 0.030 | 0.150 | 0.0016 | | | | 0.03 | |
| 71 | 0.72 | 0.10 | 0.40 | 0.013 | 0.040 | 0.150 | 0.0120 | | 0.01 | | | |
| 72 | 0.73 | 0.08 | 0.38 | 0.008 | 0.058 | 0.150 | 0.0046 | | | 0.01 | 4.50 | 0.02 |
| 73 | 0.70 | 0.05 | 0.49 | 0.009 | 0.017 | 0.130 | 0.0050 | | | 0.12 | 0.01 | 0.03 |
| 74 | 0.74 | 0.07 | 0.22 | 0.009 | 0.017 | 0.130 | 0.0050 | | | 0.04 | 1.00 | 3.00 |
| 75 | 0.64 | 0.44 | 0.57 | 0.016 | 0.050 | 0.970 | 0.0110 | | 0.37 | | | |
| 76 | 0.70 | 0.30 | 0.45 | 0.007 | 0.080 | 0.700 | 0.0160 | | | | | |
| 77 | 0.72 | 0.10 | 0.43 | 0.009 | 0.052 | 0.150 | 0.0064 | 0.0015 | | | 1.00 | 1.50 |
| 78 | 0.74 | 0.10 | 0.34 | 0.010 | 0.021 | 0.200 | 0.0110 | | | | | |
| 79 | 0.66 | 0.29 | 0.66 | 0.010 | 0.014 | 0.115 | 0.0045 | | | 0.02 | | |
| 80 | 0.72 | 0.01 | 0.11 | 0.011 | 0.020 | 0.128 | 0.0039 | | | 0.01 | 0.25 | |
| 81 | 0.73 | 0.05 | 0.24 | 0.019 | 0.023 | 0.780 | 0.0060 | | | 0.03 | 0.004 | |
| 82 | 0.74 | 0.05 | 0.20 | 0.002 | 0.090 | 0.880 | 0.0016 | | 0.02 | | | |
| 83 | 0.73 | 0.05 | 0.78 | 0.010 | 0.019 | 0.980 | 0.0039 | | | | | |
| 84 | 0.74 | 0.29 | 0.25 | 0.033 | 0.005 | 0.795 | 0.0063 | 0.0019 | 0.01 | | | |
| 85 | 0.60 | 0.59 | 0.75 | 0.003 | 0.025 | 0.170 | 0.0050 | | | | | |
| 86 | 0.64 | 0.57 | 0.54 | 0.010 | 0.007 | 0.150 | 0.0030 | | | | | |
| 87 | 0.59 | 0.61 | 0.75 | 0.005 | 0.006 | 0.125 | 0.0110 | | 0.02 | | | |
| 88 | 0.58 | 0.65 | 0.74 | 0.015 | 0.015 | 0.110 | 0.0050 | | 0.11 | | | |
| 89 | 0.61 | 0.44 | 0.80 | 0.045 | 0.005 | 0.160 | 0.0020 | | | | 1.30 | |
| 90 | 0.60 | 0.48 | 0.84 | 0.008 | 0.070 | 0.150 | 0.0050 | | | | 0.80 | 1.00 |
| 91 | 0.60 | 0.48 | 0.83 | 0.014 | 0.020 | 0.200 | 0.0055 | | | | | |

TABLE 3-continued

| Number | | | | | | | | | | |
|---|---|---|---|---|---|---|---|---|---|---|
| 92 | 0.65 | 0.15 | 0.79 | 0.008 | 0.006 | 0.150 | 0.0080 | | | |
| 93 | 0.65 | 0.45 | 0.61 | 0.018 | 0.090 | 0.250 | 0.0057 | | 0.03 | |
| 94 | 0.64 | 0.21 | 0.83 | 0.010 | 0.072 | 0.150 | 0.0110 | | | |
| 95 | 0.65 | 1.30 | 0.87 | 0.015 | 0.030 | 0.900 | 0.0042 | | | |
| 96 | 0.55 | 0.70 | 1.20 | 0.020 | 0.020 | 0.150 | 0.0060 | | 0.10 | |
| 97 | 0.44 | 0.50 | 0.90 | 0.010 | 0.012 | 0.150 | 0.0080 | | | |
| 98 | 0.55 | 0.71 | 0.40 | 0.014 | 0.020 | <u>0.030</u> | 0.0050 | | | |
| 99 | 0.57 | 0.25 | 0.62 | 0.005 | 0.016 | <u>0.090</u> | 0.0110 | | | |
| 100 | 0.55 | 1.00 | 0.40 | 0.015 | 0.010 | <u>1.200</u> | 0.0040 | 0.0010 | | |
| 101 | 0.41 | 0.30 | <u>2.14</u> | 0.012 | 0.050 | 0.800 | 0.0055 | 0.0018 | | |
| 102 | 0.51 | 0.23 | 0.78 | 0.008 | 0.080 | 0.270 | 0.0113 | | <u>0.90</u> | |
| 103 | 0.45 | 0.09 | 1.78 | 0.007 | 0.050 | 0.121 | <u>0.0210</u> | 0.0020 | | |
| 104 | <u>0.35</u> | 1.00 | 1.50 | 0.008 | 0.070 | 0.130 | 0.0100 | | | |
| 105 | <u>0.75</u> | 0.10 | 0.25 | 0.010 | 0.040 | 0.015 | 0.0040 | | | |

| | Component (mass %) | | | | | | | | | | |
|---|---|---|---|---|---|---|---|---|---|---|---|
| Number | Ca | Mg | Zr | Rem | Ti | Nb | W | V | Ta | Hf | Others |
| 51 | | | | | | | | | | | |
| 52 | | | | | | | | | | | |
| 53 | | | | | | | | | | | |
| 54 | | | | | | | | | | | |
| 55 | | | | | | | | | | | |
| 56 | | | | | | | | | | | |
| 57 | | | | | | | | | | | |
| 58 | | | | | | | | | | | |
| 59 | | | | | | | | | | | |
| 60 | | | | | | | | | | | |
| 61 | | | | | | | | | | | |
| 62 | | | | | | | | | | | |
| 63 | | | | | | | | | | | |
| 64 | | | | | | | | | | | Pb: 0.05 |
| 65 | | | | | | | | | | | Bi: 0.1 |
| 66 | | | | | | | | | | | Te: 0.001 |
| 67 | | | | | | | | | | | Ba: 0.0001 |
| 68 | 0.0008 | | | | | | | | | | |
| 69 | | 0.0008 | | | | | | | | | |
| 70 | | | 0.0003 | | | | | | | | |
| 71 | | | | | | | | | | | |
| 72 | | | | 0.0009 | | | | | | | |
| 73 | 0.0004 | | 0.0003 | | | | | | | | |
| 74 | | 0.0012 | | 0.0006 | | | | | | | |
| 75 | 0.0013 | | | 0.0011 | | | | | | | |
| 76 | | 0.0018 | 0.0021 | | | | | | | | |
| 77 | | | | 0.0048 | 0.05 | | 0.10 | | | 0.01 | |
| 78 | | | | | 0.30 | 0.02 | 0.05 | 0.46 | 0.15 | 0.0006 | |
| 79 | 0.0013 | | 0.0020 | | 0.13 | | | 0.12 | | 0.16 | Sn: 0.1, Zn: 0.011 |
| 80 | | 0.0110 | 0.0050 | 0.0110 | | 0.04 | | | 0.0007 | 0.05 | Te: 0.001, Bi: 0.07 |
| 81 | 0.0020 | 0.0150 | | | | 0.07 | 0.003 | | 0.003 | 0.003 | Ba: 0.0001, Na: 0.0001 |
| 82 | | | | 0.0152 | | | | | | | |
| 83 | | | | | | | | | | | |
| 84 | | 0.0005 | | | | | 0.0006 | | | | |
| 85 | | | 0.0147 | | | | | 0.07 | | | Sb: 0.005 |
| 86 | | | | | | | | | | | Se: 0.0001, Pb: 0.07 |
| 87 | | | | | 0.11 | 0.0008 | | | | | K: 0.0001 |
| 88 | 0.0001 | | | | 0.42 | | | 0.0008 | | | Sr: 0.0001, Na: 0.0001 |
| 89 | | | | | | | | | | 0.10 | |
| 90 | | 0.0001 | | | | | | | | 0.10 | |
| 91 | 0.0150 | | | | | | | 0.03 | | | |
| 92 | | | | | | 0.10 | | | | | |
| 93 | | | | | | | | 0.005 | | | |
| 94 | 0.0100 | | | | | 0.41 | | | | | |
| 95 | | | | | | | | | | | |
| 96 | | | | | | | | | | | |
| 97 | | | | | | | | | | | |
| 98 | | | | | | | | | | | |
| 99 | | | | | | | | | | | |
| 100 | | | | | | | | | | | |
| 101 | | | | | | | | | | | |
| 102 | | | | | | | | | | | |
| 103 | | | | | | | | | | | |
| 104 | | | | | | | | | | | |
| 105 | | | | | | | | | | | |

TABLE 4

| Number | In the case where steel does not contain Cr<br>(1) $139.38 \leq 214 \times [C] + 30.6 \times [Si] + 42.8 [Mn] - 14.7 \times [Al] \leq 177$<br>In the case where steel contains Cr<br>(6) $139.38 \leq 214 \times [C] + 30.6 \times [Si] + 42.8 \times [Mn] + 23.8 [Cr] - 14.7 \times [Al] \leq 177$ | In the case where steel does not contain Cr<br>(2) $0.72 \leq [C] + 1/7 [Si] + 1/5 [Mn] < 1.539$<br>In the case where steel contains Cr<br>(7) $0.72 \leq [C] + 1/7 [Si] + 1/5 [Mn] + 1/9 [Cr] < 1.627$ | In the case where steel does not contain Cr<br>(3) $113 - 135 \times [C] - 27 \times [Mn] \leq 13$<br>In the case where steel contains Cr<br>(8) $113 - 135 \times [C] - 27 \times [Mn] - 18 \times [Cr] \leq 13$ | In the case where steel does not contain Cr<br>(4) $55 \leq 33 + 31 \times [C] + 4.5 \times [Si] + 1.5 \times [Mn] < 72.45$<br>In the case where steel contains Cr<br>(9) $55 \leq 33 + 31 \times [C] + 4.5 \times [Si] + 1.5 \times [Mn] + 2.4 \times [Cr] < 74.37$ | (5) $1.5 < [Si] + 1.8 [Mn] < 6.24$ |
|---|---|---|---|---|---|
| 1 | 155.84 | 0.737 | 14.45 | 53.98 | 0.770 |
| 2 | 155.41 | 0.734 | 30.02 | 54.51 | 1.300 |
| 3 | 154.72 | 0.733 | 26.60 | 54.83 | 1.010 |
| 4 | 159.74 | 0.754 | 19.85 | 49.60 | 3.060 |
| 5 | 153.62 | 0.731 | 37.40 | 53.18 | 2.190 |
| 6 | 149.22 | 0.736 | 18.50 | 51.13 | 2.050 |
| 7 | 153.58 | 0.728 | 24.26 | 51.28 | 2.138 |
| 8 | 165.40 | 0.783 | 8.24 | 53.85 | 1.364 |
| 9 | 171.20 | 0.810 | 5.54 | 54.70 | 1.414 |
| 10 | 171.15 | 0.810 | 5.81 | 54.73 | 1.406 |
| 11 | 157.20 | 0.742 | 11.30 | 54.81 | 0.210 |
| 12 | 161.97 | 0.767 | 10.40 | 53.26 | 1.400 |
| 13 | 153.07 | 0.726 | 12.79 | 54.17 | 0.208 |
| 14 | 164.08 | 0.777 | 9.05 | 51.22 | 2.300 |
| 15 | 176.71 | 0.850 | 9.86 | 51.07 | 3.786 |
| 16 | 176.11 | 0.852 | 9.32 | 53.53 | 2.850 |
| 17 | 157.18 | 0.743 | 12.83 | 48.01 | 3.088 |
| 18 | 161.97 | 0.767 | 10.40 | 50.68 | 2.390 |
| 19 | 161.97 | 0.767 | 10.40 | 50.91 | 2.300 |
| 20 | 164.67 | 0.781 | 8.51 | 49.14 | 3.146 |
| 21 | 165.87 | 0.785 | 7.88 | 53.19 | 1.634 |
| 22 | 166.05 | 0.786 | 8.78 | 53.34 | 1.648 |
| 23 | 172.91 | 0.818 | 4.46 | 51.23 | 2.836 |
| 24 | 169.47 | 0.800 | 5.81 | 51.68 | 2.390 |
| 25 | 166.66 | 0.799 | 5.72 | 52.50 | 2.030 |
| 26 | 176.95 | 0.837 | 0.95 | 50.50 | 3.290 |
| 27 | 164.94 | 0.837 | 4.55 | 51.51 | 3.000 |
| 28 | 176.05 | 0.877 | 6.17 | 54.57 | 2.760 |
| 29 | 173.85 | 0.820 | 4.19 | 53.36 | 2.044 |
| 30 | 175.28 | 0.836 | 5.81 | 54.45 | 2.010 |
| 31 | 153.01 | 0.725 | 12.92 | 49.11 | 2.134 |
| 32 | 168.15 | 0.794 | 14.45 | 55.78 | 1.170 |
| 33 | 160.39 | 0.760 | 23.36 | 55.57 | 1.066 |
| 34 | 153.55 | 0.726 | 15.13 | 55.05 | 0.190 |
| 35 | 151.57 | 0.741 | 33.17 | 55.10 | 1.410 |

TABLE 4-continued

| | Characteristics before hardening | | | Characteristics after hardening | | |
|---|---|---|---|---|---|---|
| Number | Hardness (HV) | Amount of wear of tool (μm) | Pro-eutectoid ferrite fraction (%) | Tempered hardness (Hv) at 300° C. of hardened layer | Roller pitting fatigue strength (MPa) | Remarks |
| 1 | 207 | 27 | 14.6 | 595 | 3150 | Example of the present invention |
| 2 | 206 | 27 | 35.7 | 604 | 3150 | Example of the present invention |
| 3 | 206 | 26 | 31.1 | 608 | 3150 | Example of the present invention |
| 4 | 210 | 29 | 21.9 | 516 | 2800 | Example of the present invention |
| 5 | 206 | 26 | 45.8 | 580 | 3100 | Example of the present invention |
| 6 | 206 | 23 | 20.1 | 543 | 2950 | Example of the present invention |
| 7 | 205 | 26 | 27.9 | 546 | 2950 | Example of the present invention |
| 8 | 217 | 27 | 6.1 | 592 | 3150 | Example of the present invention |
| 9 | 222 | 40 | 2.4 | 608 | 3150 | Example of the present invention |
| 10 | 222 | 36 | 2.8 | 608 | 3150 | Example of the present invention |
| 11 | 208 | 28 | 10.3 | 609 | 3150 | Example of the present invention |
| 12 | 213 | 31 | 9.0 | 582 | 3100 | Example of the present invention |
| 13 | 204 | 25 | 12.3 | 598 | 3150 | Example of the present invention |
| 14 | 215 | 26 | 7.2 | 545 | 2950 | Example of the present invention |
| 15 | 231 | 39 | 8.3 | 542 | 2900 | Example of the present invention |
| 16 | 231 | 38 | 7.6 | 587 | 3100 | Example of the present invention |
| 17 | 208 | 30 | 12.3 | 487 | 2700 | Example of the present invention |
| 18 | 213 | 31 | 9.0 | 535 | 2900 | Example of the present invention |
| 19 | 213 | 31 | 9.0 | 539 | 2900 | Example of the present invention |
| 20 | 216 | 32 | 6.5 | 507 | 2800 | Example of the present invention |
| 21 | 217 | 33 | 5.6 | 580 | 3100 | Example of the present invention |
| 22 | 217 | 27 | 6.8 | 583 | 3100 | Example of the present invention |
| 23 | 224 | 37 | 1.0 | 545 | 2950 | Example of the present invention |
| 24 | 220 | 35 | 2.8 | 553 | 2950 | Example of the present invention |
| 25 | 220 | 33 | 2.7 | 568 | 3050 | Example of the present invention |
| 26 | 228 | 33 | 0.0 | 532 | 2900 | Example of the present invention |
| 27 | 228 | 28 | 1.1 | 550 | 2950 | Example of the present invention |
| 28 | 237 | 38 | 3.3 | 605 | 3150 | Example of the present invention |
| 29 | 225 | 38 | 0.6 | 583 | 3100 | Example of the present invention |
| 30 | 228 | 32 | 2.8 | 603 | 3150 | Example of the present invention |
| 31 | 204 | 25 | 12.5 | 507 | 2800 | Example of the present invention |
| 32 | 219 | 38 | 14.6 | 627 | 3300 | Example of the present invention |
| 33 | 212 | 24 | 26.7 | 623 | 3250 | Example of the present invention |
| 34 | 204 | 26 | 15.5 | 614 | 3250 | Example of the present invention |
| 35 | 208 | 24 | 40.0 | 615 | 3250 | Example of the present invention |

TABLE 5

| Number | In the case where steel does not contain Cr (1) 139.38 ≤ 214 × [C] + 30.6 × [Si] + 42.8 × [Mn] − 14.7 × [Al] ≤ 177  In the case where steel contains Cr (6) 139.38 ≤ 214 × [C] + 30.6 × [Si] + 42.8 × [Mn] + 23.8 [Cr] − 14.7 × [Al] ≤ 177 | In the case where steel does not contain Cr (2) 0.72 ≤ [C] + 1/7 [Si] + 1/5 [Mn] < 1.539  In the case where steel contains Cr (7) 0.72 ≤ [C] + 1/7 [Si] + 1/5 [Mn] + 1/9 [Cr] < 1.627 | In the case where steel does not contain Cr (3) 113 − 135 × [C] − 27 × [Mn] ≤ 13  In the case where steel contains Cr (8) 113 − 135 × [C] − 27 × [Mn] − 18 × [Cr] ≤ 13 | In the case where steel does not contain Cr (4) 55 ≤ 33 + 31 × [C] + 4.5 × [Si] + 1.5 × [Mn] < 72.45  In the case where steel contains Cr (9) 55 ≤ 33 + 31 × [C] + 4.5 × [Si] + 1.5 × [Mn] + 2.4 × [Cr] < 74.37 | (5) 1.5 < [Si] + 1.8 [Mn] < 6.24 |
|---|---|---|---|---|---|
| 36 | 175.20 | 0.836 | 21.20 | 58.05 | 1.450 |
| 37 | 175.38 | 0.830 | 19.31 | 57.76 | 1.346 |
| 38 | 176.71 | 0.836 | 14.18 | 57.29 | 1.378 |
| 39 | 175.41 | 0.833 | 13.10 | 57.93 | 1.010 |
| 40 | 165.50 | 0.781 | 24.62 | 55.27 | 1.620 |
| 41 | 169.06 | 0.800 | 45.50 | 56.78 | 2.550 |
| 42 | 167.41 | 0.799 | 19.85 | 55.78 | 1.544 |
| 43 | 173.71 | 0.820 | 46.85 | 56.71 | 3.030 |
| 44 | 173.82 | 0.822 | 36.32 | 56.79 | 2.482 |
| 45 | 176.73 | 0.836 | 20.39 | 55.33 | 2.454 |
| 46 | 176.78 | 0.836 | 15.53 | 55.41 | 2.168 |
| 47 | 176.83 | 0.837 | 14.09 | 56.14 | 1.810 |
| 48 | 176.22 | 0.831 | 28.76 | 55.25 | 2.836 |
| 49 | 157.46 | 0.746 | 39.02 | 55.16 | 1.786 |
| 50 | 158.41 | 0.750 | 38.75 | 55.18 | 1.850 |
| 51 | 158.63 | 0.749 | 42.08 | 55.05 | 1.870 |
| 52 | 162.97 | 0.772 | 25.79 | 55.20 | 1.564 |
| 53 | 160.34 | 0.816 | 35.06 | 56.96 | 2.126 |
| 54 | 161.49 | 0.796 | 25.25 | 55.39 | 1.920 |
| 55 | 152.52 | 0.720 | 56.30 | 55.00 | 2.280 |
| 56 | 172.97 | 0.832 | 47.93 | 57.98 | 2.828 |
| 57 | 175.90 | 0.851 | 31.46 | 57.66 | 2.424 |
| 58 | 176.61 | 0.835 | 26.42 | 57.10 | 2.080 |
| 59 | 175.08 | 0.828 | 20.66 | 57.01 | 1.676 |
| 60 | 176.91 | 0.894 | 49.55 | 60.47 | 3.150 |
| 61 | 165.95 | 0.786 | 11.75 | 55.03 | 1.150 |
| 62 | 174.88 | 0.834 | 11.75 | 56.56 | 1.490 |
| 63 | 176.66 | 0.836 | 11.75 | 58.48 | 0.780 |
| 64 | 171.28 | 0.828 | 12.02 | 57.47 | 1.020 |
| 65 | 168.57 | 0.798 | 9.32 | 55.45 | 1.092 |
| 66 | 169.31 | 0.801 | 10.40 | 56.69 | 0.740 |
| 67 | 174.82 | 0.827 | 9.05 | 56.79 | 1.120 |
| 68 | 174.51 | 0.826 | 9.05 | 57.69 | 0.750 |
| 69 | 166.07 | 0.786 | 7.70 | 56.19 | 0.490 |
| 70 | 166.25 | 0.787 | 7.70 | 56.47 | 0.410 |

TABLE 5-continued

| | Characteristics before hardening | | | Characteristics after hardening | | |
|---|---|---|---|---|---|---|
| Number | Hardness (HV) | Amount of wear of tool (μm) | Pro-eutectoid ferrite fraction (%) | Tempered hardness (Hv) at 300° C. of hardened layer | Roller pitting fatigue strength (MPa) | Remarks |
| 36 | 228 | 38 | 23.7 | 668 | 3450 | Example of the present invention |
| 37 | 227 | 38 | 21.2 | 663 | 3450 | Example of the present invention |
| 38 | 228 | 33 | 14.2 | 654 | 3400 | Example of the present invention |
| 39 | 227 | 44 | 12.7 | 666 | 3450 | Example of the present invention |
| 40 | 216 | 37 | 28.4 | 618 | 3250 | Example of the present invention |
| 41 | 220 | 35 | 56.8 | 645 | 3350 | Example of the present invention |
| 42 | 220 | 28 | 21.9 | 627 | 3300 | Example of the present invention |
| 43 | 224 | 37 | 58.6 | 644 | 3350 | Example of the present invention |
| 44 | 225 | 37 | 44.3 | 645 | 3350 | Example of the present invention |
| 45 | 228 | 33 | 22.6 | 619 | 3250 | Example of the present invention |
| 46 | 228 | 39 | 16.0 | 620 | 3250 | Example of the present invention |
| 47 | 228 | 39 | 14.1 | 634 | 3300 | Example of the present invention |
| 48 | 227 | 39 | 34.0 | 618 | 3250 | Example of the present invention |
| 49 | 209 | 28 | 48.0 | 616 | 3250 | Example of the present invention |
| 50 | 210 | 29 | 47.6 | 616 | 3250 | Example of the present invention |
| 51 | 209 | 29 | 52.1 | 614 | 3250 | Example of the present invention |
| 52 | 214 | 31 | 30.0 | 617 | 3250 | Example of the present invention |
| 53 | 224 | 25 | 42.6 | 648 | 3350 | Example of the present invention |
| 54 | 219 | 30 | 29.2 | 620 | 3250 | Example of the present invention |
| 55 | 203 | 25 | 71.5 | 613 | 3200 | Example of the present invention |
| 56 | 227 | 37 | 60.1 | 667 | 3450 | Example of the present invention |
| 57 | 231 | 38 | 37.7 | 661 | 3400 | Example of the present invention |
| 58 | 228 | 39 | 30.8 | 651 | 3400 | Example of the present invention |
| 59 | 226 | 35 | 23.0 | 649 | 3350 | Example of the present invention |
| 60 | 240 | 33 | 62.3 | 711 | 3650 | Example of the present invention |
| 61 | 217 | 33 | 10.9 | 613 | 3200 | Example of the present invention |
| 62 | 228 | 38 | 10.9 | 641 | 3350 | Example of the present invention |
| 63 | 228 | 33 | 10.9 | 676 | 3500 | Example of the present invention |
| 64 | 226 | 36 | 11.2 | 658 | 3400 | Example of the present invention |
| 65 | 220 | 28 | 7.6 | 621 | 3250 | Example of the present invention |
| 66 | 221 | 32 | 9.0 | 643 | 3350 | Example of the present invention |
| 67 | 226 | 38 | 7.2 | 645 | 3350 | Example of the present invention |
| 68 | 226 | 38 | 7.2 | 661 | 3450 | Example of the present invention |
| 69 | 217 | 27 | 5.4 | 634 | 3300 | Example of the present invention |
| 70 | 217 | 33 | 5.4 | 639 | 3350 | Example of the present invention |

TABLE 6

| Number | In the case where steel does not contain Cr (1) 139.38 ≤ 214 × [C] + 30.6 × [Si] + 42.8 × [Mn] − 14.7 × [Al] ≤ 177<br>In the case where steel contains Cr (6) 139.38 ≤ 214 × [C] + 30.6 × [Si] + 42.8 × [Mn] + 23.8 [Cr] − 14.7 × [Al] ≤ 177 | In the case where steel does not contain Cr (2) 0.72 ≤ [C] + 1/7 [Si] + 1/5 [Mn] < 1.539<br>In the case where steel contains Cr (7) 0.72 ≤ [C] + 1/7 [Si] + 1/5 [Mn] + 1/9 [Cr] < 1.627 | In the case where steel does not contain Cr (3) 113 − 135 × [C] − 27 × [Mn] ≤ 13<br>In the case where steel contains Cr (8) 113 − 135 × [C] − 27 × [Mn] − 18 × [Cr] ≤ 13 | In the case where steel does not contain Cr (4) 55 ≤ 33 + 31 × [C] + 4.5 × [Si] + 1.5 × [Mn] < 72.45<br>In the case where steel contains Cr (9) 55 ≤ 33 + 31 × [C] + 4.5 × [Si] + 1.5 × [Mn] + 2.4 × [Cr] < 74.37 | (5) 1.5 < [Si] + 1.8 [Mn] < 6.24 | Characteristics before hardening Hardness (HV) |
|---|---|---|---|---|---|---|
| 71 | 172.29 | 0.815 | 4.82 | 56.39 | 0.820 | 223 |
| 72 | 172.73 | 0.817 | 4.19 | 56.56 | 0.764 | 224 |
| 73 | 170.39 | 0.805 | 5.27 | 55.66 | 0.932 | 221 |
| 74 | 168.01 | 0.794 | 7.16 | 56.59 | 0.466 | 219 |
| 75 | 169.37 | 0.858 | 4.55 | 56.56 | 1.466 | 233 |
| 76 | 167.95 | 0.833 | 6.35 | 56.73 | 1.110 | 227 |
| 77 | 173.34 | 0.820 | 4.19 | 56.42 | 0.874 | 225 |
| 78 | 173.03 | 0.822 | 3.92 | 56.90 | 0.712 | 225 |
| 79 | 176.67 | 0.833 | 6.08 | 55.76 | 1.478 | 227 |
| 80 | 157.21 | 0.743 | 12.83 | 55.53 | 0.208 | 208 |
| 81 | 156.56 | 0.785 | 7.97 | 56.22 | 0.482 | 217 |
| 82 | 155.99 | 0.789 | 7.34 | 56.51 | 0.410 | 218 |
| 83 | 176.73 | 0.893 | -6.61 | 57.03 | 1.454 | 240 |
| 84 | 166.49 | 0.833 | 6.17 | 57.64 | 0.740 | 227 |
| 85 | 176.06 | 0.834 | 11.75 | 55.38 | 1.940 | 228 |
| 86 | 175.31 | 0.829 | 12.02 | 56.22 | 1.542 | 226 |
| 87 | 175.66 | 0.829 | 12.74 | 55.21 | 1.960 | 226 |
| 88 | 176.68 | 0.833 | 12.74 | 55.28 | 1.982 | 227 |
| 89 | 175.89 | 0.833 | 9.05 | 55.09 | 1.880 | 227 |
| 90 | 176.84 | 0.837 | 9.32 | 55.02 | 1.992 | 228 |
| 91 | 175.67 | 0.835 | 9.59 | 55.01 | 1.974 | 228 |
| 92 | 175.30 | 0.829 | 3.92 | 55.01 | 1.572 | 226 |
| 93 | 176.02 | 0.840 | 8.24 | 56.16 | 1.548 | 229 |
| 94 | 176.71 | 0.836 | 4.19 | 55.03 | 1.704 | 228 |
| 95 | 202.89 | 1.010 | 1.76 | 60.31 | 2.866 | 265 |
| 96 | 190.66 | 0.901 | 4.55 | 55.24 | 2.860 | 242 |
| 97 | 145.78 | 0.691 | 29.30 | 50.24 | 2.120 | 197 |
| 98 | 156.11 | 0.731 | 27.95 | 53.85 | 1.430 | 206 |
| 99 | 154.84 | 0.730 | 19.31 | 52.73 | 1.366 | 205 |
| 100 | 147.78 | 0.773 | 27.95 | 55.15 | 1.720 | 214 |
| 101 | 176.75 | 0.881 | -0.13 | 50.27 | 4.152 | 238 |
| 102 | 167.01 | 0.799 | 6.89 | 53.18 | 1.634 | 220 |
| 103 | 173.46 | 0.819 | 4.19 | 50.03 | 3.294 | |
| 104 | 167.79 | 0.793 | 25.25 | 50.60 | 3.700 | 219 |
| 105 | 174.04 | 0.814 | 5.00 | 57.08 | 0.550 | |

TABLE 6-continued

| Number | Characteristics before hardening | | Characteristics after hardening | | Remarks |
|---|---|---|---|---|---|
| | Amount of wear of tool (μm) | Pro-eutectoid ferrite fraction (%) | Tempered hardness (Hv) at 300° C. of hardened layer | Roller pitting fatigue strength (MPa) | |
| 71 | 37 | 1.5 | 638 | 3350 | Example of the present invention |
| 72 | 34 | 0.6 | 641 | 3350 | Example of the present invention |
| 73 | 38 | 2.1 | 625 | 3250 | Example of the present invention |
| 74 | 34 | 4.6 | 642 | 3350 | Example of the present invention |
| 75 | 31 | 1.1 | 641 | 3350 | Example of the present invention |
| 76 | 27 | 3.5 | 644 | 3350 | Example of the present invention |
| 77 | 34 | 0.6 | 638 | 3350 | Example of the present invention |
| 78 | 37 | 0.2 | 647 | 3350 | Example of the present invention |
| 79 | 39 | 3.2 | 627 | 3300 | Example of the present invention |
| 80 | 28 | 12.3 | 623 | 3250 | Example of the present invention |
| 81 | 27 | 5.7 | 635 | 3300 | Example of the present invention |
| 82 | 20 | 4.9 | 640 | 3350 | Example of the present invention |
| 83 | 33 | 0.0 | 649 | 3400 | Example of the present invention |
| 84 | 32 | 3.3 | 661 | 3400 | Example of the present invention |
| 85 | 39 | 10.9 | 620 | 3250 | Example of the present invention |
| 86 | 38 | 11.2 | 635 | 3300 | Example of the present invention |
| 87 | 39 | 12.2 | 617 | 3250 | Example of the present invention |
| 88 | 39 | 12.2 | 618 | 3250 | Example of the present invention |
| 89 | 39 | 7.2 | 615 | 3250 | Example of the present invention |
| 90 | 33 | 7.6 | 613 | 3200 | Example of the present invention |
| 91 | 39 | 7.9 | 613 | 3200 | Example of the present invention |
| 92 | 38 | 0.2 | 613 | 3200 | Example of the present invention |
| 93 | 33 | 6.1 | 634 | 3300 | Example of the present invention |
| 94 | 33 | 0.6 | 614 | 3200 | Example of the present invention |
| 95 | 180 | 0.0 | 708 | 3600 | Comparative Example |
| 96 | 95 | 1.1 | 617 | 3250 | Comparative Example |
| 97 | 21 | 34.7 | 527 | 2850 | Comparative Example |
| 98 | 100 | 32.9 | 592 | 3150 | Comparative Example |
| 99 | 90 | 21.2 | 572 | 3050 | Comparative Example |
| 100 | 22 | 32.9 | High-frequency hardening could not be applied | | Comparative Example |
| 101 | 85 | 0.0 | 528 | 2850 | Comparative Example |
| 102 | 79 | 4.3 | 580 | 3100 | Comparative Example |
| 103 | Hot shortening appeared during rolling | | | | Comparative Example |
| 104 | 34 | 29.2 | Lack of surface hardness | | Comparative Example |
| 105 | Seasoning crack occurred in rolled material | | | | Comparative Example |

The invention claimed is:

1. A steel for a machine structure, the steel comprising, in mass %:
   C: 0.40% to less than 0.75%;
   Si: 0.01% to 3.0%;
   Mn: 072% to 1.8%;
   S: 0.001% to 0.1%;
   Al: more than 0.1% and not more than 1.0%;
   N: 0.001% to 0.02%; and
   P: limited to not more than 0.05%,
   with a balance including Fe and inevitable impurities,
   wherein
   an amount of C: [C], an amount of Si: [Si], an amount of Mn: [Mn], and an amount of Al: [Al] satisfy the following Expression (1) and Expression (2):

$$139.38 \leq 214 \times [C] + 30.6 \times [Si] + 42.8 \times [Mn] - 14.7 \times [Al] \leq 177 \quad (1)$$

$$0.72 \leq [C] + 1/7 \times [Si] + 1/5 \times [Mn] < 1.539 \quad (2).$$

2. The steel for a machine structure according to claim 1, wherein the steel further satisfies the following Expression (3):

$$113 - 135 \times [C] - 27 \times [Mn] \leq 13 \quad (3).$$

3. The steel for a machine structure according to claim 1, wherein the steel further satisfies the following Expression (4):

$$55 \leq 33 + 31 \times [C] + 4.5 \times [Si] + 1.5 \times [Mn] < 72.45 \quad (4).$$

4. The steel for a machine structure according to claim 2, wherein the steel further satisfies the following Expression (4):

$$55 \leq 33 + 31 \times [C] + 4.5 \times [Si] + 1.5 \times [Mn] < 72.45 \quad (4).$$

5. The steel for a machine structure according to claim 1, wherein the steel further satisfies the following Expression (5):

$$1.5 < [Si] + 1.8 \times [Mn] < 6.24 \quad (5).$$

6. The steel for a machine structure according to claim 1, wherein the steel further comprises B: 0.0001% to 0.015% in mass %.

7. The steel for a machine structure according to claim 4, wherein the steel further comprises, in mass %, one or more elements of Cr: 0.01% to 0.8%, Mo: 0.001% to 1.0%, Ni: 0.001% to 5.0%, and Cu: 0.001% to 5.0%, and
   in a case where the steel comprises Cr: 0.01% to 0.8%, the following Expression (6) is satisfied instead of Expression (1), the following Expression (7) is satisfied instead of Expression (2), the following Expression (8) is satisfied instead of Expression (3), and the following Expression (9) is satisfied instead of Expression (4):

$$139.38 \leq 214 \times [C] + 30.6 \times [Si] + 42.8 \times [Mn] + 23.8 \times [Cr] - 14.7 \times [Al] \leq 177 \quad (6)$$

$$0.72 \leq [C] + 1/7 \times [Si] + 1/5 \times [Mn] + 1/9 \times [Cr] < 1.627 \quad (7)$$

$$113 - 135 \times [C] - 27 \times [Mn] - 18 \times [Cr] \leq 13 \quad (8)$$

$$55 \leq 33 + 31 \times [C] + 4.5 \times [Si] + 1.5 \times [Mn] + 2.4 \times [Cr] < 74.37 \quad (9).$$

8. The steel for a machine structure according to claim 1, wherein the steel further comprises, in mass %, one or more elements of Ca: 0.0001% to 0.02%, Mg: 0.0001% to 0.02%, Zr: 0.0001% to 0.02%, and Rem: 0.0001% to 0.02%.

9. The steel for a machine structure according to claim 1, wherein the steel further comprises, in mass %, one or more elements of Ti: 0.005% to 0.5%, Nb: 0.0005% to 0.5%, W: 0.0005% to 0.5%, V: 0.0005% to 0.5%, Ta: 0.0001% to 0.2%, and Hf: 0.0001% to 0.2%.

10. The steel for a machine structure according to claim 1, wherein the steel further comprises, in mass %, one or more elements of Sb: 0.0001% to 0.015%, Sn: 0.0005% to 2.0%, Zn: 0.0005% to 0.5%, Te: 0.0003% to 0.2%, Se: 0.0003% to 0.2%, Bi: 0.001% to 0.5%, and Pb: 0.001% to 0.5%.

11. The steel for a machine structure according to claim 1, wherein the steel further comprises, in mass %, one or more elements of Li: 0.00001% to 0.005%, Na: 0.00001% to 0.005%, K: 0.00001% to 0.005%, Ba: 0.00001% to 0.005%, and Sr: 0.00001% to 0.005%.

12. The steel for a machine structure according to claim 2, wherein the steel further satisfies the following Expression (5):

$$1.5 < [Si] + 1.8 \times [Mn] < 6.24 \quad (5).$$

13. The steel for a machine structure according to claim 3, wherein the steel further satisfies the following Expression (5):

$$1.5 < [Si] + 1.8 \times [Mn] < 6.24 \quad (5).$$

14. The steel for a machine structure according to claim 4, wherein the steel further satisfies the following Expression (5):

$$1.5 < [Si] + 1.8 \times [Mn] < 6.24 \quad (5).$$

15. The steel for a machine structure according to claim 2, wherein the steel further comprises B: 0.0001% to 0.015% in mass %.

16. The steel for a machine structure according to claim 3, wherein the steel further comprises B: 0.0001% to 0.015% in mass %.

17. The steel for a machine structure according to claim 4, wherein the steel further comprises B: 0.0001% to 0.015% in mass %.

18. A steel for a machine structure, the steel comprising, in mass %:
   C: 0.40% to less than 0.75%;
   Si: 0.01% to 3.0%;
   Mn: 0.72 to 1.8%;
   S: 0.001% to 0.1%;
   Al: more than 0.1% and not more than 1.0%;
   N: 0.001% to 0.02%;
   at least one element selected from the group consisting of B: 0.0001% to 0.015%, Cr: 0.01% to 0.8%, Mo: 0.001% to 1.0%, Ni: 0.001% to 5.0%, Cu: 0.001% to 5.0%, Ca: 0.0001% to 0.02%, Mg: 0.0001% to 0.02%, Zr: 0.0001% to 0.02%, Rem: 0.0001% to 0.02%, Ti: 0.005% to 0.5%, Nb: 0.0005% to 0.5%, W: 0.0005% to 0.5%, V: 0.0005% to 0.5%, Ta: 0.0001% to 0.2%, Hf: 0.0001% to 0.2%, Sb: 0.0001% to 0.015%, Sn: 0.0005% to 2.0%, Zn: 0.0005% to 0.5%, Te: 0.0003% to 0.2%, Se: 0.0003% to 0.2%, Bi: 0.001% to 0.5%, Pb: 0.001% to 0.5%, Li: 0.00001% to 0.005%, Na: 0.00001% to 0.005%, K: 0.00001% to 0.005%, Ba: 0.00001% to 0.005%, and Sr: 0.00001% to 0.005%; and
   P: limited to not more than 0.05%,
   with a balance including Fe and inevitable impurities, wherein an amount of C: [C], an amount of Si: [Si], an amount of Mn: [Mn], and an amount of Al: [Al] satisfy the following Expression (1) and Expression (2):

$$139.38 \leq 214 \times [C] + 30.6 \times [Si] + 42.8 \times [Mn] - 14.7 \times [Al] \leq 177 \quad (1)$$

$$0.72 \leq [C] + 1/7 \times [Si] + 1/5 \times [Mn] < 1.539 \quad (2), \text{and}$$

in a case where the steel comprises Cr: 0.01% to 0.8%, the following Expression (6) is satisfied instead of Expression (1), and the following Expression (7) is satisfied instead of Expression (2):

$$139.38 \leq 214 \times [C] + 30.6 \times [Si] + 42.8 \times [Mn] + 23.8 \times [Cr] - 14.7 \times [Al] \leq 177 \quad (6)$$

$$0.72 \leq [C] + 1/7 \times [Si] + 1/5 \times [Mn] + 1/9 \times [Cr] < 1.627 \quad (7).$$

19. The steel for a machine structure according to claim 18, wherein the steel further satisfies the following Expression (3):

$$113 - 135 \times [C] - 27 \times [Mn] \leq 13 \quad (3), \text{and}$$

in a case where the steel comprises Cr: 0.01% to 0.8%, the following Expression (8) is satisfied instead of Expression (3):

$$113 - 135 \times [C] - 27 \times [Mn] - 18 \times [Cr] \leq 13 \quad (8).$$

20. The steel for a machine structure according to claim 18, wherein the steel further satisfies the following Expression (4):

$$55 \leq 33 + 31 \times [C] + 4.5 \times [Si] + 1.5 \times [Mn] < 72.45 \quad (4), \text{and}$$

in a case where the steel comprises Cr: 0.01% to 0.8%, the following Expression (9) is satisfied instead of Expression (4):

$$55 \leq 33 + 31 \times [C] + 4.5 \times [Si] + 1.5 \times [Mn] + 2.4 \times [Cr] < 74.37 \quad (9).$$

21. The steel for a machine structure according to claim 19, wherein the steel further satisfies the following Expression (4):

$$55 \leq 33 + 31 \times [C] + 4.5 \times [Si] + 1.5 \times [Mn] < 72.45 \quad (4), \text{and}$$

in a case where the steel comprises Cr: 0.01% to 0.8%, the following Expression (9) is satisfied instead of Expression (4):

$$55 \leq 33 + 31 \times [C] + 4.5 \times [Si] + 1.5 \times [Mn] + 2.4 \times [Cr] < 74.37 \quad (9).$$

22. The steel for a machine structure according to claim 18, wherein the steel further satisfies the following Expression (5):

$$1.5 < [Si] + 1.8 \times [Mn] < 6.24 \quad (5).$$

23. The steel for a machine structure according to claim 19, wherein the steel further satisfies the following Expression (5):

$$1.5 < [Si] + 1.8 \times [Mn] < 6.24 \quad (5).$$

24. The steel for a machine structure according to claim 20, wherein the steel further satisfies the following Expression (20):

$$1.5 < [Si] + 1.8 \times [Mn] < 6.24 \quad (5).$$

25. The steel for a machine structure according to claim 21, wherein the steel further satisfies the following Expression (5):

$$1.5 < [Si] + 1.8 \times [Mn] < 6.24 \quad (5).$$

\* \* \* \* \*